United States Patent
Hendry et al.

(10) Patent No.: US 12,184,880 B2
(45) Date of Patent: Dec. 31, 2024

(54) IMAGE ENCODING/DECODING METHOD AND APPARATUS FOR DETERMINING SUBLAYER ON BASIS OF WHETHER OR NOT TO MAKE REFERENCE BETWEEN LAYERS, AND METHOD FOR TRANSMITTING BITSTREAM

(71) Applicant: LG ELECTRONICS INC., Seoul (KR)

(72) Inventors: Hendry Hendry, Seoul (KR); Seethal Paluri, Seoul (KR); Seung Hwan Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 147 days.

(21) Appl. No.: 17/915,928

(22) PCT Filed: Mar. 31, 2021

(86) PCT No.: PCT/KR2021/004005
§ 371 (c)(1),
(2) Date: Sep. 29, 2022

(87) PCT Pub. No.: WO2021/201598
PCT Pub. Date: Oct. 7, 2021

(65) Prior Publication Data
US 2023/0319302 A1   Oct. 5, 2023

Related U.S. Application Data

(60) Provisional application No. 63/006,730, filed on Apr. 8, 2020, provisional application No. 63/003,271, filed on Mar. 31, 2020.

(51) Int. Cl.
*H04N 19/503* (2014.01)
*H04N 19/105* (2014.01)
(Continued)

(52) U.S. Cl.
CPC ......... *H04N 19/503* (2014.11); *H04N 19/105* (2014.11); *H04N 19/184* (2014.11); *H04N 19/31* (2014.11)

(58) Field of Classification Search
CPC .. H04N 19/503; H04N 19/105; H04N 19/184; H04N 19/31
(Continued)

(56) References Cited

U.S. PATENT DOCUMENTS

| 11,683,508 B2 * | 6/2023 | Tsukuba | H04N 19/44 |
| | | | 375/211 |
| 2016/0261878 A1 * | 9/2016 | Deshpande | H04N 19/187 |

FOREIGN PATENT DOCUMENTS

| KR | 10-2017-0121317 A | 11/2017 |
| KR | 10-2018-0066098 A | 6/2018 |

(Continued)

OTHER PUBLICATIONS

Bross, (2020). "Versatile Video Coding (Draft 8)", JVET-Q2001-vE, Joint Video Experts Team (JVET) of ITU-T SG 16 WP 3 and ISO/IEC JTC 1/SC 29/WG 11, 17th Meeting: Brussels, BE, See pp. 37-39, 94-96.

*Primary Examiner* — Sath V Perungavoor
*Assistant Examiner* — Kristin Dobbs
(74) *Attorney, Agent, or Firm* — Bryan Cave Leighton Paisner LLP

(57) ABSTRACT

An image encoding/decoding method and apparatus is provided. The image decoding method performed by the image decoding apparatus may comprise determining inter-layer direct reference and determining the number of sublayers of a current layer based on the inter-layer direct reference.

13 Claims, 17 Drawing Sheets

(51) Int. Cl.
*H04N 19/184* (2014.01)
*H04N 19/31* (2014.01)

(58) Field of Classification Search
USPC .................................................. 375/240.02
See application file for complete search history.

(56) References Cited

FOREIGN PATENT DOCUMENTS

KR  10-2018-0069136 A   6/2018
KR  10-2019-0132974 A   11/2019

\* cited by examiner

FIG. 9

| video_parameter_set_rbsp( ) { | Descriptor |
|---|---|
|   vps_video_parameter_set_id | u(4) |
|   vps_max_layers_minus1 | u(6) |
|   vps_max_sublayers_minus1 | u(3) |
|   if( vps_max_layers_minus1 > 0 && vps_max_sublayers_minus1 > 0 ) | |
|     vps_all_layers_same_num_sublayers_flag | u(1) |
|   if( vps_max_layers_minus1 > 0 ) | |
|     vps_all_independent_layers_flag | u(1) |
|   for( i = 0; i <= vps_max_layers_minus1; i++ ) { | |
|     vps_layer_id[ i ] | u(6) |
|     if( i > 0 && !vps_all_independent_layers_flag ) { | |
|       vps_independent_layer_flag[ i ] | u(1) |
|       if( !vps_independent_layer_flag[ i ] ) { | |
|         for( j = 0; j < i; j++ ) | |
|           vps_direct_ref_layer_flag[ i ][ j ] | u(1) |
|         max_tid_ref_present_flag[ i ] | u(1) |
|         if( max_tid_ref_present_flag[ i ] ) | |
|           max_tid_il_ref_pics_plus1[ i ] | u(3) |
|       } | |
|     } | |
|   } | |
|   if( vps_max_layers_minus1 > 0 ) { | |
|     if( vps_all_independent_layers_flag ) | |
|       each_layer_is_an_ols_flag | u(1) |
|     if( !each_layer_is_an_ols_flag ) { | |
|       if( !vps_all_independent_layers_flag ) | |
|         ols_mode_idc | u(2) |
|       if( ols_mode_idc == 2 ) { | |
|         num_output_layer_sets_minus1 | u(8) |
|         for( i = 1; i <= num_output_layer_sets_minus1; i ++) | |
|           for( j = 0; j <= vps_max_layers_minus1; j++ ) | |
|             ols_output_layer_flag[ i ][ j ] | u(1) |
|       } | |
|     } | |
|   } | |
| ... | |

FIG. 10

```
for( i = 0; i <= vps_max_layers_minus1; i++ ) {
    for( j = 0; j <= vps_max_layers_minus1; j++ ) {
        dependencyFlag[ i ][ j ] = vps_direct_ref_layer_flag[ i ][ j ]
        for( k = 0; k < i; k++ )
            if( vps_direct_ref_layer_flag[ i ][ k ] && dependencyFlag[ k ][ j ] )
                dependencyFlag[ i ][ j ] = 1
    }
    LayerUsedAsRefLayerFlag[ i ] = 0
}
for( i = 0; i <= vps_max_layers_minus1; i++ ) {
    for( j = 0, d = 0, r = 0; j <= vps_max_layers_minus1; j++ ) {
        if( vps_direct_ref_layer_flag[ i ][ j ] ) {
            DirectRefLayerIdx[ i ][ d++ ] = j
            LayerUsedAsRefLayerFlag[ j ] = 1
        }
        if( dependencyFlag[ i ][ j ] )
            RefLayerIdx[ i ][ r++ ] = j
    }
    NumDirectRefLayers[ i ] = d
    NumRefLayers[ i ] = r
}
```

FIG. 11

```
if( vps_max_layers_minus1 == 0 )
    TotalNumOlss = 1
else if( each_layer_is_an_ols_flag || ols_mode_idc == 0 || ols_mode_idc == 1 )
    TotalNumOlss = vps_max_layers_minus1 + 1
else if( ols_mode_idc == 2 )
    TotalNumOlss = num_output_layer_sets_minus1 + 1
```

FIG. 12

```
NumOutputLayersInOls[ 0 ] = 1
OutputLayerIdInOls[ 0 ][ 0 ] = vps_layer_id[ 0 ]
NumSubLayersInLayerInOLS[ 0 ][ 0 ] = vps_max_sub_layers_minus1 + 1
LayerUsedAsOutputLayerFlag[ 0 ] = 1
for( i = 1, i <= vps_max_layers_minus1; i++ ) {
    if( each_layer_is_an_ols_flag || ols_mode_idc < 2 )
        LayerUsedAsOutputLayerFlag[ i ] = 1
    else /*( !each_layer_is_an_ols_flag && ols_mode_idc == 2 )*/
        LayerUsedAsOutputLayerFlag[ i ] = 0
}
for( i = 1; i < TotalNumOlss; i++ )
    if( each_layer_is_an_ols_flag || ols_mode_idc == 0 ) {
        NumOutputLayersInOls[ i ] = 1
        OutputLayerIdInOls[ i ][ 0 ] = vps_layer_id[ i ]
        for( j = 0; j < i && ( ols_mode_idc == 0 ); j++ )
            NumSubLayersInLayerInOLS[ i ][ j ] = max_tid_il_ref_pics_plus1[ i ]
        NumSubLayersInLayerInOLS[ i ][ i ] = vps_max_sub_layers_minus1 + 1
    } else if( ols_mode_idc == 1 ) {
        NumOutputLayersInOls[ i ] = i + 1
        for( j = 0; j < NumOutputLayersInOls[ i ]; j++ ) {
            OutputLayerIdInOls[ i ][ j ] = vps_layer_id[ j ]
            NumSubLayersInLayerInOLS[ i ][ j ] = vps_max_sub_layers_minus1 + 1
        }
    } else if( ols_mode_idc == 2 ) {
        for( j = 0; j <= vps_max_layers_minus1; j++ ) {
            layerIncludedInOlsFlag[ i ][ j ] = 0
            NumSubLayersInLayerInOLS[ i ][ j ] = 0
        }
        for( k = 0, j = 0; k <= vps_max_layers_minus1; k++ )
            if( ols_output_layer_flag[ i ][ k ] ) {
                layerIncludedInOlsFlag[ i ][ k ] = 1
                LayerUsedAsOutputLayerFlag[ k ] = 1
                OutputLayerIdx[ i ][ j ] = k
                OutputLayerIdInOls[ i ][ j++ ] = vps_layer_id[ k ]
                NumSubLayersInLayerInOLS[ i ][ j ] = vps_max_sub_layers_minus1 + 1
            }
        NumOutputLayersInOls[ i ] = j
        for( j = 0; j < NumOutputLayersInOls[ i ]; j++ ) {
            idx = OutputLayerIdx[ i ][ j ]
            for( k = 0; k < NumRefLayers[ idx ]; k++ ) {
                layerIncludedInOlsFlag[ i ][ RefLayerIdx[ idx ][ k ] ] = 1
                if( NumSubLayersInLayerInOLS[ i ][ RefLayerIdx[ idx ][ k ] ] < max_tid_il_ref_pics_plus1[ OutputLayerIdInOls[ i ][ j ] ] )
                    NumSubLayersInLayerInOLS[ i ][ RefLayerIdx[ idx ][ k ] ] =
                        max_tid_il_ref_pics_plus1[ OutputLayerIdInOls[ i ][ j ] ]
            }
        }
    }
```

FIG. 13

```
NumLayersInOls[ 0 ] = 1
LayerIdInOls[ 0 ][ 0 ] = vps_layer_id[ 0 ]
for( i = 1; i < TotalNumOlss; i++ ) {
    if( each_layer_is_an_ols_flag ) {
        NumLayersInOls[ i ] = 1
        LayerIdInOls[ i ][ 0 ] = vps_layer_id[ i ]
    } else if( ols_mode_idc == 0 || ols_mode_idc == 1 ) {
        NumLayersInOls[ i ] = i + 1
        for( j = 0; j < NumLayersInOls[ i ]; j++ )
            LayerIdInOls[ i ][ j ] = vps_layer_id[ j ]
    } else if( ols_mode_idc == 2 ) {
        for( k = 0, j = 0; k <= vps_max_layers_minus1; k++ )
            if( layerIncludedInOlsFlag[ i ][ k ] )
                LayerIdInOls[ i ][ j++ ] = vps_layer_id[ k ]
        NumLayersInOls[ i ] = j
    }
}
```

FIG. 14

```
for( i = 0; i < TotalNumOlss; i++ )
    for( j = 0; j < NumLayersInOls[ i ]; j++ )
        OlsLayerIdx[ i ][ LayerIdInOls[ i ][ j ] ] = j
```

FIG. 15

| video_parameter_set_rbsp( ) { | Descriptor |
|---|---|
| ... | |
|   vps_max_layers_minus1 | u(6) |
|   vps_max_sublayers_minus1 | u(3) |
|   if( vps_max_layers_minus1 > 0 && vps_max_sublayers_minus1 > 0 ) | |
|     vps_all_layers_same_num_sublayers_flag | u(1) |
|   if( vps_max_layers_minus1 > 0 ) | |
|     vps_all_independent_layers_flag | u(1) |
|   for( i = 0; i <= vps_max_layers_minus1; i++ ) { | |
|     vps_layer_id[ i ] | u(6) |
|     if( i > 0 && !vps_all_independent_layers_flag ) { | |
|       vps_independent_layer_flag[ i ] | u(1) |
|       if( !vps_independent_layer_flag[ i ] ) { | |
|         max_tid_ref_present_flag[ i ] | u(1) |
|         for( j = 0; j < i; j++ ) { | |
|           vps_direct_ref_layer_flag[ i ][ j ] | u(1) |
|           ~~max_tid_ref_present_flag[ i ]~~ | ~~u(1)~~ |
|           if( max_tid_ref_present_flag[ i ] && vps_direct_ref_layer_flag[ i ][ j ] ) | |
|             max_tid_il_ref_pics_plus1[ i ][ j ] | u(3) |
|         } | |
|       } | |
|     } | |
|   } | |

FIG. 16

```
NumOutputLayersInOls[ 0 ] = 1
OutputLayerIdInOls[ 0 ][ 0 ] = vps_layer_id[ 0 ]
NumSubLayersInLayerInOLS[ 0 ][ 0 ] = vps_max_sub_layers_minus1 + 1
LayerUsedAsOutputLayerFlag[ 0 ] = 1
for( i = 1, i <= vps_max_layers_minus1; i++ ) {
    if( each_layer_is_an_ols_flag || ols_mode_idc < 2 )
        LayerUsedAsOutputLayerFlag[ i ] = 1
    else /*( !each_layer_is_an_ols_flag && ols_mode_idc == 2 ) */
        LayerUsedAsOutputLayerFlag[ i ] = 0
}
for( i = 1; i < TotalNumOlss; i++ )
    if( each_layer_is_an_ols_flag || ols_mode_idc == 0 ) {
        NumOutputLayersInOls[ i ] = 1
        OutputLayerIdInOls[ i ][ 0 ] = vps_layer_id[ i ]
        for( j = 0; j < i && ( ols_mode_idc == 0 ); j++ )
            NumSubLayersInLayerInOLS[ i ][ j ] = max_tid_il_ref_pics_plus1[ i ][ j ]
        NumSubLayersInLayerInOLS[ i ][ i ] = vps_max_sub_layers_minus1 + 1
    } else if( ols_mode_idc == 1 ) {
        NumOutputLayersInOls[ i ] = i + 1
        for( j = 0; j < NumOutputLayersInOls[ i ]; j++ ) {
            OutputLayerIdInOls[ i ][ j ] = vps_layer_id[ j ]
            NumSubLayersInLayerInOLS[ i ][ j ] = vps_max_sub_layers_minus1 + 1
        }
    } else if( ols_mode_idc == 2 ) {
        for( j = 0; j <= vps_max_layers_minus1; j++ ) {
            layerIncludedInOlsFlag[ i ][ j ] = 0
            NumSubLayersInLayerInOLS[ i ][ j ] = 0
        }
        for( k = 0, j = 0; k <= vps_max_layers_minus1; k++ )
            if( ols_output_layer_flag[ i ][ k ] ) {
                layerIncludedInOlsFlag[ i ][ k ] = 1
                LayerUsedAsOutputLayerFlag[ k ] = 1
                OutputLayerIdx[ i ][ j ] = k
                OutputLayerIdInOls[ i ][ j++ ] = vps_layer_id[ k ]
                NumSubLayersInLayerInOLS[ i ][ j ] = vps_max_sub_layers_minus1 + 1
            }
        NumOutputLayersInOls[ i ] = j
        for( j = 0; j < NumOutputLayersInOls[ i ]; j++ ) {
            idx = OutputLayerIdx[ i ][ j ]
            for( k = 0; k < NumRefLayers[ idx ]; k++ ) {
                layerIncludedInOlsFlag[ i ][ RefLayerIdx[ idx ][ k ] ] = 1
                maxSublayerNeeded = max_tid_il_ref_pics_plus1
                    [ OutputLayerIdInOls[ i ][ j ] ][ RefLayerIdx[ idx ][ k ] ]
                if( NumSubLayersInLayerInOLS[ i ][ RefLayerIdx[ idx ][ k ] ] <
                        maxSublayerNeeded )
                    NumSubLayersInLayerInOLS[ i ][ RefLayerIdx[ idx ][ k ] ] =
                        maxSublayerNeeded
            }
        }
    }
```

FIG. 17

| video_parameter_set_rbsp( ) { | Descriptor |
|---|---|
| ... | |
|   vps_max_layers_minus1 | u(6) |
|   vps_max_sublayers_minus1 | u(3) |
|   if( vps_max_layers_minus1 > 0 && vps_max_sublayers_minus1 > 0 ) | |
|     vps_all_layers_same_num_sublayers_flag | u(1) |
|   if( vps_max_layers_minus1 > 0 ) | |
|     vps_all_independent_layers_flag | u(1) |
|   if( !vps_all_independent_layers_flag ) | |
|     max_tid_ref_present_flag | u(1) |
|   for( i = 0; i <= vps_max_layers_minus1; i++ ) { | |
|     vps_layer_id[ i ] | u(6) |
|     if( i > 0 && !vps_all_independent_layers_flag ) { | |
|       vps_independent_layer_flag[ i ] | u(1) |
|       if( !vps_independent_layer_flag[ i ] ) { | |
|         for( j = 0; j < i; j++ ) | |
|           vps_direct_ref_layer_flag[ i ][ j ] | u(1) |
|         ~~max_tid_ref_present_flag[ i ]~~ | ~~u(1)~~ |
|         if( max_tid_ref_present_flag~~[ i ]~~ ) | |
|           max_tid_il_ref_pics_plus1[ i ] | u(3) |
|       } | |
|     } | |
|   } | |

FIG. 18

```
NumOutputLayersInOls[ 0 ] = 1
OutputLayerIdInOls[ 0 ][ 0 ] = vps_layer_id[ 0 ]
NumSubLayersInLayerInOLS[ 0 ][ 0 ] = vps_max_sub_layers_minus1 + 1
LayerUsedAsOutputLayerFlag[ 0 ] = 1
for( i = 1; i <= vps_max_layers_minus1; i++ ) {
    if( each_layer_is_an_ols_flag || ols_mode_idc < 2 )
        LayerUsedAsOutputLayerFlag[ i ] = 1
    else /*( !each_layer_is_an_ols_flag && ols_mode_idc == 2 )*/
        LayerUsedAsOutputLayerFlag[ i ] = 0
}
for( i = 1; i < TotalNumOlss; i++ )
    if( each_layer_is_an_ols_flag || ols_mode_idc == 0 ) {
        NumOutputLayersInOls[ i ] = 1
        OutputLayerIdInOls[ i ][ 0 ] = vps_layer_id[ i ]
        for( j = 0; j < i && ( ols_mode_idc == 0 ); j++ )
            NumSubLayersInLayerInOLS[ i ][ j ] = max_tid_il_ref_pics_plus1[ i ][ j ]
        NumSubLayersInLayerInOLS[ i ][ i ] = vps_max_sub_layers_minus1 + 1
        if( each_layer_is_an_ols_flag )
            NumSubLayersInLayerInOLS[ i ][ 0 ] = vps_max_sub_layers_minus1 + 1
        else {
            for( k = 0; k < i; k++ ) {
                for( l = k + 1; l <= i; l++ )
                    if( vps_direct_ref_layer_flag[ l ][ k ] &&
                            NumSubLayersInLayerInOLS[ i ][ k ] < max_tid_il_ref_pics_plus1[ l ][ k ] )
                        NumSubLayersInLayerInOLS[ i ][ k ] = max_tid_il_ref_pics_plus1[ l ][ k ]
            }
        }
    } else if( ols_mode_idc == 1 ) {
        NumOutputLayersInOls[ i ] = i + 1
        for( j = 0; j < NumOutputLayersInOls[ i ]; j++ ) {
            OutputLayerIdInOls[ i ][ j ] = vps_layer_id[ j ]
            NumSubLayersInLayerInOLS[ i ][ j ] = vps_max_sub_layers_minus1 + 1
        }
    } else if( ols_mode_idc == 2 ) {
        for( j = 0; j <= vps_max_layers_minus1; j++ ) {
            layerIncludedInOlsFlag[ i ][ j ] = 0
            NumSubLayersInLayerInOLS[ i ][ j ] = 0
        }
        for( k = 0, j = 0; k <= vps_max_layers_minus1; k++ )
            if( ols_output_layer_flag[ i ][ k ] ) {
                layerIncludedInOlsFlag[ i ][ k ] = 1
                LayerUsedAsOutputLayerFlag[ k ] = 1
                OutputLayerIdx[ i ][ j ] = k
                OutputLayerIdInOls[ i ][ j++ ] = vps_layer_id[ k ]
                NumSubLayersInLayerInOLS[ i ][ j ] = vps_max_sub_layers_minus1 + 1
            }
        NumOutputLayersInOls[ i ] = j
        for( j = 0; j < NumOutputLayersInOls[ i ]; j++ ) {
            idx = OutputLayerIdx[ i ][ j ]
            for( k = 0; k < NumRefLayers[ idx ]; k++ ) {
                layerIncludedInOlsFlag[ i ][ RefLayerIdx[ idx ][ k ] ] = 1
                if( NumSubLayersInLayerInOLS[ i ][ RefLayerIdx[ idx ][ k ] ] <
                        max_tid_il_ref_pics_plus1[ OutputLayerIdInOls[ i ][ j ] ] )
                    NumSubLayersInLayerInOLS[ i ][ RefLayerIdx[ idx ][ k ] ] =
                            max_tid_il_ref_pics_plus1[ OutputLayerIdInOls[ i ][ j ] ]
            }
        }
        for( k = 0, tIdx = 0; k < vps_max_layers_minus1; k++ )
            if( layerIncludedInOlsFlag[ i ][ k ] ) {
                if( !ols_output_layer_flag[ i ][ k ] )
                    for( l = k + 1; l <= vps_max_layers_minus1; l++ )
                        if( vps_direct_ref_layer_flag[ l ][ k ] && layerIncludedInOlsFlag[ i ][ l ] &&
                                NumSubLayersInLayerInOLS[ i ][ tIdx ] < max_tid_il_ref_pics_plus1[ l ][ k ] )
                            NumSubLayersInLayerInOLS[ i ][ tIdx ] =
                                    max_tid_il_ref_pics_plus1[ l ][ k ]
                tIdx++
            }
    }
```

IMAGE ENCODING/DECODING METHOD AND APPARATUS FOR DETERMINING SUBLAYER ON BASIS OF WHETHER OR NOT TO MAKE REFERENCE BETWEEN LAYERS, AND METHOD FOR TRANSMITTING BITSTREAM

This application is the National Stage filing under 35 U.S.C. 371 of International Application No. PCT/KR2021/004005, filed on Mar. 31, 2021, which claims the benefit of U.S. Provisional Application No. 63/003,271, filed on Mar. 31, 2020, and U.S. Provisional Application No. 63/006,730, filed on Apr. 8, 2020 the contents of which are all hereby incorporated by reference herein in their entirety.

TECHNICAL FIELD

The present disclosure relates to an image encoding/decoding method and apparatus, and, more particularly, to an image encoding and decoding method and apparatus for determining a sublayer based on inter-layer reference, and a method of transmitting a bitstream generated by the image encoding method/apparatus of the present disclosure.

BACKGROUND ART

Recently, demand for high-resolution and high-quality images such as high definition (HD) images and ultra high definition (UHD) images is increasing in various fields. As resolution and quality of image data are improved, the amount of transmitted information or bits relatively increases as compared to existing image data. An increase in the amount of transmitted information or bits causes an increase in transmission cost and storage cost.

Accordingly, there is a need for high-efficient image compression technology for effectively transmitting, storing and reproducing information on high-resolution and high-quality images.

DISCLOSURE

Technical Problem

An object of the present disclosure is to provide an image encoding/decoding method and apparatus with improved encoding/decoding efficiency.

Another object of the present disclosure is to provide an image encoding/decoding method and apparatus for improving encoding/decoding efficiency by determining a sublayer based on inter-layer reference.

Another object of the present disclosure is to provide a method of transmitting a bitstream generated by an image encoding method or apparatus according to the present disclosure.

Another object of the present disclosure is to provide a recording medium storing a bitstream generated by an image encoding method or apparatus according to the present disclosure.

Another object of the present disclosure is to provide a recording medium storing a bitstream received, decoded and used to reconstruct an image by an image decoding apparatus according to the present disclosure. For example, a bitstream for enabling the image decoding apparatus according to the present disclosure to perform the image decoding method according to the present disclosure may be stored in the recording medium.

The technical problems solved by the present disclosure are not limited to the above technical problems and other technical problems which are not described herein will become apparent to those skilled in the art from the following description.

Technical Solution

An image decoding method performed by an image decoding apparatus according to an aspect of the present disclosure may comprise determining inter-layer direct reference and determining the number of sublayers of a current layer based on the inter-layer direct reference.

In addition, an image decoding apparatus may comprise a memory and at least one processor. The at least one processor may be configured to determine inter-layer direct reference and to determine the number of sublayers of a current layer based on the inter-layer direct reference.

In addition, an image encoding method performed by an image encoding apparatus may comprise determining inter-layer direct reference and determining the number of sublayers of a current layer based on the inter-layer direct reference.

Also, a transmission method according to another aspect of the present disclosure may transmit a bitstream generated by an image encoding apparatus or method according to the present disclosure.

Also, a computer-readable recording medium according to another aspect of the present disclosure may store a bitstream generated by an image encoding method or apparatus according to the present disclosure.

Also, a computer-readable recording medium according to another aspect of the present disclosure may store a bitstream for enabling a decoding apparatus to perform the image decoding method according to the present disclosure.

The features briefly summarized above with respect to the present disclosure are merely exemplary aspects of the detailed description below of the present disclosure, and do not limit the scope of the present disclosure.

Advantageous Effects

According to the present disclosure, it is possible to provide an image encoding/decoding method and apparatus with improved encoding/decoding efficiency.

Also, according to the present disclosure, it is possible to provide an image encoding/decoding method and apparatus for improving encoding/decoding efficiency by determining a sublayer based on inter-layer reference.

Also, according to the present disclosure, it is possible to provide a method of transmitting a bitstream generated by an image encoding method or apparatus according to the present disclosure.

Also, according to the present disclosure, it is possible to provide a recording medium storing a bitstream generated by an image encoding method or apparatus according to the present disclosure.

Also, according to the present disclosure, it is possible to provide a recording medium storing a bitstream received, decoded and used to reconstruct an image by an image decoding apparatus according to the present disclosure.

It will be appreciated by persons skilled in the art that that the effects that can be achieved through the present disclosure are not limited to what has been particularly described hereinabove and other advantages of the present disclosure will be more clearly understood from the detailed description.

DESCRIPTION OF DRAWINGS

FIG. 9 is a view illustrating a syntax structure of a VPS according to an embodiment of the present disclosure.

FIGS. 10 to 14 are views illustrating a pseudocode for deriving a VPS related variable according to an embodiment of the present disclosure.

FIG. 15 is a view illustrating a syntax structure of a VPS according to another embodiment of the present disclosure.

FIG. 16 is a view illustrating a pseudocode for deriving a VPS related variable according to another embodiment of the present disclosure.

FIG. 17 is a view illustrating a syntax structure of a VPS according to another embodiment of the present disclosure.

FIG. 18 is a view illustrating a pseudocode for deriving a VPS related variable according to another embodiment of the present disclosure.

MODE FOR INVENTION

Figure 1:
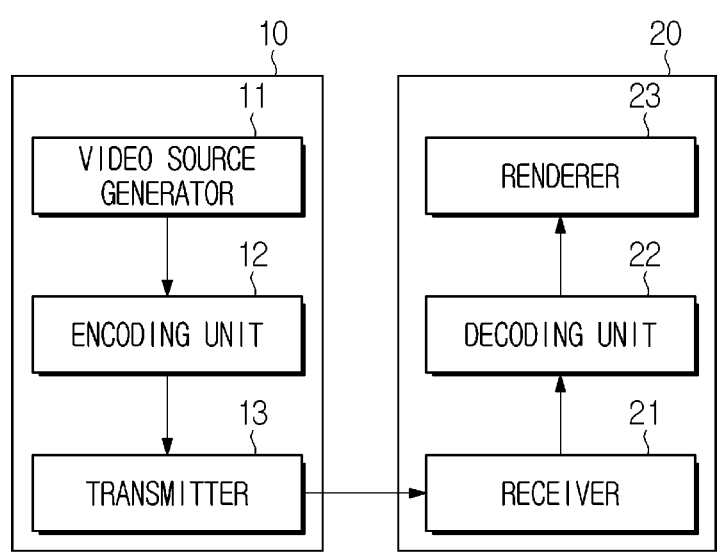
FIG. 1 is a view schematically showing a video coding system, to which an embodiment of the present disclosure is applicable.

Hereinafter, the embodiments of the present disclosure will be described in detail with reference to the accompanying drawings so as to be easily implemented by those skilled in the art. However, the present disclosure may be implemented in various different forms, and is not limited to the embodiments described herein.

In describing the present disclosure, if it is determined that the detailed description of a related known function or construction renders the scope of the present disclosure unnecessarily ambiguous, the detailed description thereof will be omitted. In the drawings, parts not related to the description of the present disclosure are omitted, and similar reference numerals are attached to similar parts.

In the present disclosure, when a component is "connected", "coupled" or "linked" to another component, it may include not only a direct connection relationship but also an indirect connection relationship in which an intervening component is present. In addition, when a component "includes" or "has" other components, it means that other components may be further included, rather than excluding other components unless otherwise stated.

In the present disclosure, the terms first, second, etc. may be used only for the purpose of distinguishing one component from other components, and do not limit the order or importance of the components unless otherwise stated. Accordingly, within the scope of the present disclosure, a first component in one embodiment may be referred to as a second component in another embodiment, and similarly, a second component in one embodiment may be referred to as a first component in another embodiment.

In the present disclosure, components that are distinguished from each other are intended to clearly describe each feature, and do not mean that the components are necessarily separated. That is, a plurality of components may be integrated and implemented in one hardware or software unit, or one component may be distributed and implemented in a plurality of hardware or software units. Therefore, even if not stated otherwise, such embodiments in which the components are integrated or the component is distributed are also included in the scope of the present disclosure.

In the present disclosure, the components described in various embodiments do not necessarily mean essential components, and some components may be optional components. Accordingly, an embodiment consisting of a subset of components described in an embodiment is also included in the scope of the present disclosure. In addition, embodiments including other components in addition to components described in the various embodiments are included in the scope of the present disclosure.

The present disclosure relates to encoding and decoding of an image, and terms used in the present disclosure may have a general meaning commonly used in the technical field, to which the present disclosure belongs, unless newly defined in the present disclosure.

Method/embodiments disclosed in the present disclosure are applicable to methods disclosed in the versatile video coding (VVC) standard. In addition, method/embodiments disclosed in the present disclosure are applicable to methods disclosed in the essential video coding (EVC) standard, the AOMedia Video 1 (AV1) standard, the 2nd generation of audio video coding standard (AVS2) or the next-generation video/image coding standard (e.g., .267 or H.268).

In the present disclosure, various embodiments of video/image coding are provided and embodiments of the present disclosure, which are not described, may be performed in combination.

In the present disclosure, a "video" may mean a set of images over time. A "picture" generally refers to a unit representing one image at a specific time, and a slice/tile is a coding unit constituting a portion of a picture in coding. A slice/tile may include one or more coding tree units (CTUs). The CTU may be partitioned into one or more CUs.

One picture may consist of one or more slices/tiles. A tile is a rectangular area within a particular tile row and a particular tile column in a picture and may consist of plurality of CTUs. The tile column may be defined as a rectangular area of CTUs and may have a height equal to the height of the picture and a width specified by a syntax element signalled from a bitstream portion such as a picture parameter set. The tile row may be defined as a rectangular area of CTUs and may have a width equal to the width of the picture and a height specified by a syntax element signalled from a bitstream portion such as a picture parameter set.

A tile scan is a specific sequential ordering of CTUs partitioning a picture. Here, the CTUs are ordered consecutively in CTU raster scan in a tile whereas tiles in a picture are ordered consecutively in a raster scan of the tiles of the picture. A slice includes an integer number of complete tiles or an integer number of consecutive complete CTU rows within a tile of a picture. The slice may be exclusively contained in a single NAL unit.

One picture may be partitioned into two or more subpictures. The subpicture may be a rectangular region of one or more slices in the picture.

One picture may include one or more tile groups. One tile group may include one or more tiles. A brick may represent a rectangular region of CTU rows within a tile in a picture. One tile may include one or more bricks. The brick may represent a rectangular region of CTU rows in a tile. One tile may be partitioned into a plurality of bricks and each brick may include one or more CTU rows belonging to a tile. A tile which is not partitioned into a plurality of bricks may also be treated as a brick.

A "pixel" or a "pel" may mean a smallest unit constituting one picture (or image). In addition, "sample" may be used as a term corresponding to a pixel. A sample may generally represent a pixel or a value of a pixel, and may represent only a pixel/pixel value of a luma component or only a pixel/pixel value of a chroma component.

In the present disclosure, a "unit" may represent a basic unit of image processing. The unit may include at least one of a specific region of the picture and information related to the region. One unit may include one luma block and two chroma blocks (e.g., Cb and Cr). The unit may be used interchangeably with the terms such as "sample array", "block" or "area" in some cases. In a general case, an M×N block may include a set (or array) of samples (or a sample array) or transform coefficients of M columns and N rows.

In the present disclosure, "current block" may mean one of "current coding block", "current coding unit", "coding target block", "decoding target block" or "processing target block". When prediction is performed, "current block" may mean "current prediction block" or "prediction target block". When transform (inverse transform)/quantization (dequantization) is performed, "current block" may mean "current transform block" or "transform target block". When filtering is performed, "current block" may mean "filtering target block".

In addition, in the present disclosure, a "current block" may mean "a luma block of a current block" unless explicitly stated as a chroma block. The "chroma block of the current block" may be expressed by including an explicit description of a chroma block, such as "chroma block" or "current chroma block".

In the present disclosure, the term "/" and "," should be interpreted to indicate "and/or." For instance, the expression "A/B" and "A, B" may mean "A and/or B." Further, "A/B/C" and "A/B/C" may mean "at least one of A, B, and/or C."

In the present disclosure, the term "or" should be interpreted to indicate "and/or." For instance, the expression "A or B" may comprise 1) only "A", 2) only "B", and/or 3) both "A and B". In other words, in the present disclosure, the term "or" should be interpreted to indicate "additionally or alternatively."

In the present disclosure, "at least one of A and B" may mean "only A", "only B" or "both A and B". In addition, in the disclosure, "at least one of A or B" or "at least one of A and/or B" may be interpreted as being the same as "at least one of A and B".

In addition, in the present disclosure, "at least one of A, B and C" may mean "only A", "only B", "only C" or "any combination of A, B and C". In addition, in the disclosure, "at least one of A, B or C" or "at least one of A, B and/or C" may be interpreted as being the same as "at least one of A, B and C".

In addition, parentheses used in the present disclosure may mean "for example". Specifically, when "prediction (intra prediction)" is described, "intra prediction" may be proposed as an example of "prediction". In other words, "prediction" of the present disclosure is not limited to "intra prediction" and "intra prediction" may be proposed as an example of "prediction". In addition, even when "prediction (that is, intra prediction)" is described, "intra prediction" may be proposed as an example of "prediction".

In the present disclosure, technical features individually described in one drawing may be implemented individually or simultaneously.

Overview of Video Coding System

FIG. 1 is a view showing a video coding system according to the present disclosure.

The video coding system according to an embodiment may include a source device 10 and a reception device 20. The source device 10 may deliver encoded video and/or image information or data to the reception device 20 in the form of a file or streaming via a digital storage medium or network.

The source device 10 according to an embodiment may include a video source generator 11, an encoding device 12 and a transmitter 13. The reception device 20 according to an embodiment may include a receiver 21, a decoding device 22 and a renderer 23. The encoding device 12 may be called a video/image encoding device, and the decoding device 22 may be called a video/image decoding device. The transmitter 13 may be included in the encoding device 12. The receiver 21 may be included in the decoding device 22. The renderer 23 may include a display and the display may be configured as a separate device or an external component.

The video source generator 11 may acquire a video/image through a process of capturing, synthesizing or generating the video/image. The video source generator 11 may include a video/image capture device and/or a video/image generating device. The video/image capture device may include, for example, one or more cameras, video/image archives including previously captured video/images, and the like. The video/image generating device may include, for example, computers, tablets and smartphones, and may (electronically) generate video/images. For example, a virtual video/image may be generated through a computer or the like. In this case, the video/image capturing process may be replaced by a process of generating related data.

The encoding device 12 may encode an input video/image. The encoding device 12 may perform a series of procedures such as prediction, transform, and quantization for compression and coding efficiency. The encoding device 12 may output encoded data (encoded video/image information) in the form of bitstream.

The transmitter 13 may transmit the encoded video/image information or data output in the form of a bitstream to the receiver 21 of the reception device 20 through a digital storage medium or a network in the form of a file or streaming. The digital storage medium may include various storage mediums such as USB, SD, CD, DVD, Blu-ray, HDD, SSD, and the like. The transmitter 13 may include an element for generating a media file through a predetermined file format and may include an element for transmission through a broadcast/communication network. The receiver 21 may extract/receive the bitstream from the storage medium or network and transmit the bitstream to the decoding device 22.

The decoding device 22 may decode the video/image by performing a series of procedures such as dequantization, inverse transform, and prediction corresponding to the operation of the encoding device 12.

The renderer 23 may render the decoded video/image. The rendered video/image may be displayed through the display.

Overview of Image Encoding Apparatus

Figure 2:
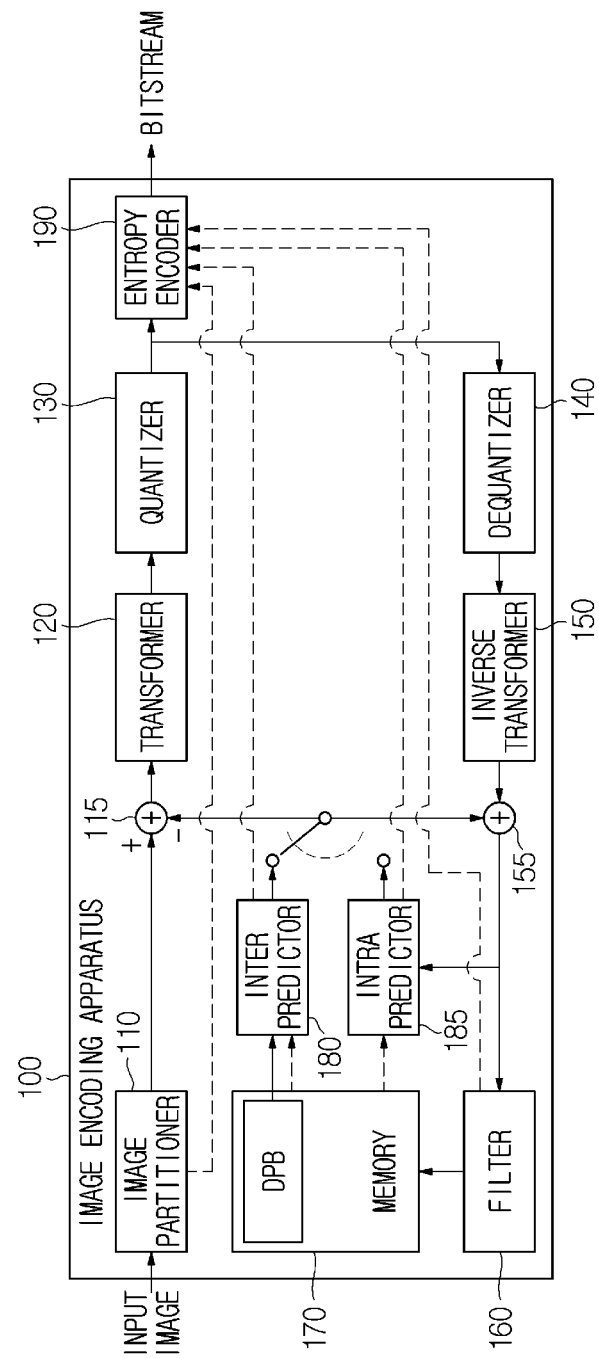
FIG. 2 is a view schematically showing an image encoding apparatus, to which an embodiment of the present disclosure is applicable.

FIG. 2 is a view schematically showing an image encoding apparatus, to which an embodiment of the present disclosure is applicable.

As shown in FIG. 2, the image source device 100 may include an image partitioner 110, a subtractor 115, a transformer 120, a quantizer 130, a dequantizer 140, an inverse transformer 150, an adder 155, a filter 160, a memory 170, an inter predictor 180, an intra predictor 185 and an entropy encoder 190. The inter predictor 180 and the intra predictor 185 may be collectively referred to as a "predictor". The transformer 120, the quantizer 130, the dequantizer 140 and the inverse transformer 150 may be included in a residual processor. The residual processor may further include the subtractor 115.

All or at least some of the plurality of components configuring the image source device 100 may be configured by one hardware component (e.g., an encoder or a processor) in some embodiments. In addition, the memory 170 may include a decoded picture buffer (DPB) and may be configured by a digital storage medium.

The image partitioner 110 may partition an input image (or a picture or a frame) input to the image source device 100 into one or more processing units. For example, the processing unit may be called a coding unit (CU). The coding unit may be acquired by recursively partitioning a coding tree unit (CTU) or a largest coding unit (LCU) according to a quad-tree binary-tree ternary-tree (QT/BT/TT) structure. For example, one coding unit may be partitioned into a plurality of coding units of a deeper depth based on a quad tree structure, a binary tree structure, and/or a ternary structure. For partitioning of the coding unit, a quad tree structure may be applied first and the binary tree structure and/or ternary structure may be applied later. The coding procedure according to the present disclosure may be performed based on the final coding unit that is no longer partitioned. The largest coding unit may be used as the final coding unit or the coding unit of deeper depth acquired by partitioning the largest coding unit may be used as the final coding unit. Here, the coding procedure may include a procedure of prediction, transform, and reconstruction, which will be described later. As another example, the processing unit of the coding procedure may be a prediction unit (PU) or a transform unit (TU). The prediction unit and the transform unit may be split or partitioned from the final coding unit. The prediction unit may be a unit of sample prediction, and the transform unit may be a unit for deriving a transform coefficient and/or a unit for deriving a residual signal from the transform coefficient.

The predictor (the inter predictor 180 or the intra predictor 185) may perform prediction on a block to be processed (current block) and generate a predicted block including prediction samples for the current block. The predictor may determine whether intra: prediction is applied on a current block or CU basis. The predictor may generate various information related to prediction of the current block and transmit the generated information to the entropy encoder 190. The information on the prediction may be encoded in the entropy encoder 190 and output in the form of a bitstream.

The intra predictor 185 may predict the current block by referring to the samples in the current picture. The referred samples may be located in the neighborhood of the current block or may be located apart according to the intra prediction mode and/or the intra prediction technique. The intra prediction modes may include a plurality of non-directional modes and a plurality of directional modes. The non-directional mode may include, for example, a DC mode and a planar mode. The directional mode may include, for example, 33 directional prediction modes or 65 directional prediction modes according to the degree of detail of the prediction direction. However, this is merely an example, more or less directional prediction modes may be used depending on a setting. The intra predictor 185 may determine the prediction mode applied to the current block by using a prediction mode applied to a neighboring block.

The inter predictor 180 may derive a predicted block for the current block based on a reference block (reference sample array) specified by a motion vector on a reference picture. In this case, in order to reduce the amount of motion information transmitted in the inter prediction mode, the motion information may be predicted in units of blocks, subblocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. The reference picture including the reference block and the reference picture including the temporal neighboring block may be the same or different. The temporal neighboring block may be called a collocated reference block, a co-located CU (colCU), and the like. The reference picture including the temporal neighboring block may be called a collocated picture (colPic). For example, the inter predictor 180 may configure a motion information candidate list based on neighboring blocks and generate information indicating which candidate is used to derive a motion vector and/or a reference picture index of the current block. Inter prediction may be performed based on various prediction modes. For example, in the case of a skip mode and a merge mode, the inter predictor 180 may use motion information of the neighboring block as motion information of the current block. In the case of the skip mode, unlike the merge mode, the residual signal may not be transmitted. In the case of the motion vector prediction (MVP) mode, the motion vector of the neighboring block may be used as a motion vector predictor, and the motion vector of the current block may be signalled by encoding a motion vector difference and an indicator for a motion vector predictor. The motion vector difference may mean a difference between the motion vector of the current block and the motion vector predictor.

The predictor may generate a prediction signal based on various prediction methods and prediction techniques described below. For example, the predictor may not only apply intra prediction or inter prediction but also simultaneously apply both intra prediction and inter prediction, in order to predict the current block. A prediction method of simultaneously applying both intra prediction and inter prediction for prediction of the current block may be called combined inter and intra prediction (CIIP). In addition, the predictor may perform intra block copy (IBC) for prediction of the current block. Intra block copy may be used for content image/video coding of a game or the like, for example, screen content coding (SCC). IBC is a method of predicting a current picture using a previously reconstructed reference block in the current picture at a location apart from the current block by a predetermined distance. When IBC is applied, the location of the reference block in the current picture may be encoded as a vector (block vector) corresponding to the predetermined distance. IBC basically performs prediction in the current picture, but may be performed similarly to inter prediction in that a reference block is derived within the current picture. That is, IBC may use at least one of the inter prediction techniques described in the present disclosure.

The prediction signal generated by the predictor may be used to generate a reconstructed signal or to generate a residual signal. The subtractor 115 may generate a residual signal (residual block or residual sample array) by subtracting the prediction signal (predicted block or prediction sample array) output from the predictor from the input image signal (original block or original sample array). The generated residual signal may be transmitted to the transformer 120.

The transformer 120 may generate transform coefficients by applying a transform technique to the residual signal. For example, the transform technique may include at least one of a discrete cosine transform (DCT), a discrete sine transform (DST), a karhunen-loève transform (KLT), a graph-based transform (GBT), or a conditionally non-linear transform (CNT). Here, the GBT means transform obtained from a graph when relationship information between pixels is represented by the graph. The CNT refers to transform acquired based on a prediction signal generated using all previously reconstructed pixels. In addition, the transform process may be applied to square pixel blocks having the same size or may be applied to blocks having a variable size rather than square.

The quantizer 130 may quantize the transform coefficients and transmit them to the entropy encoder 190. The entropy encoder 190 may encode the quantized signal (information on the quantized transform coefficients) and output a bitstream. The information on the quantized transform coefficients may be referred to as residual information. The quantizer 130 may rearrange quantized transform coefficients in a block type into a one-dimensional vector form based on a coefficient scanning order and generate information on the quantized transform coefficients based on the quantized transform coefficients in the one-dimensional vector form.

The entropy encoder 190 may perform various encoding methods such as, for example, exponential Golomb, context-adaptive variable length coding (CAVLC), context-adaptive binary arithmetic coding (CABAC), and the like. The entropy encoder 190 may encode information necessary for video/image reconstruction other than quantized transform coefficients (e.g., values of syntax elements, etc.) together or separately. Encoded information (e.g., encoded video/image information) may be transmitted or stored in units of network abstraction layers (NALs) in the form of a bitstream. The video/image information may further include information on various parameter sets such as an adaptation parameter set (APS), a picture parameter set (PPS), a sequence parameter set (SPS), or a video parameter set (VPS). In addition, the video/image information may further include general constraint information. The signalled information, transmitted information and/or syntax elements described in the present disclosure may be encoded through the above-described encoding procedure and included in the bitstream.

The bitstream may be transmitted over a network or may be stored in a digital storage medium. The network may include a broadcasting network and/or a communication network, and the digital storage medium may include various storage media such as USB, SD, CD, DVD, Blu-ray, SSD, and the like. A transmitter (not shown) transmitting a signal output from the entropy encoder 190 and/or a storage unit (not shown) storing the signal may be included as internal/external element of the image source device 100. Alternatively, the transmitter may be provided as the component of the entropy encoder 190.

The quantized transform coefficients output from the quantizer 130 may be used to generate a residual signal. For example, the residual signal (residual block or residual samples) may be reconstructed by applying dequantization and inverse transform to the quantized transform coefficients through the dequantizer 140 and the inverse transformer 150.

The adder 155 adds the reconstructed residual signal to the prediction signal output from the inter predictor 180 or the intra predictor 185 to generate a reconstructed signal (reconstructed picture, reconstructed block, reconstructed sample array). If there is no residual for the block to be processed, such as a case where the skip mode is applied, the predicted block may be used as the reconstructed block. The adder 155 may be called a reconstructor or a reconstructed block generator. The generated reconstructed signal may be used for intra prediction of a next block to be processed in the current picture and may be used for inter prediction of a next picture through filtering as described below.

The filter 160 may improve subjective/objective image quality by applying filtering to the reconstructed signal. For example, the filter 160 may generate a modified reconstructed picture by applying various filtering methods to the reconstructed picture and store the modified reconstructed picture in the memory 170, specifically, a DPB of the memory 170. The various filtering methods may include, for example, deblocking filtering, a sample adaptive offset, an adaptive loop filter, a bilateral filter, and the like. The filter 160 may generate various information related to filtering and transmit the generated information to the entropy encoder 190 as described later in the description of each filtering method. The information related to filtering may be encoded by the entropy encoder 190 and output in the form of a bitstream.

The modified reconstructed picture transmitted to the memory 170 may be used as the reference picture in the inter predictor 180. When inter prediction is applied through the image source device 100, prediction mismatch between the image source device 100 and the image decoding apparatus may be avoided and encoding efficiency may be improved.

The DPB of the memory 170 may store the modified reconstructed picture for use as a reference picture in the inter predictor 180. The memory 170 may store the motion information of the block from which the motion information in the current picture is derived (or encoded) and/or the motion information of the blocks in the picture that have already been reconstructed. The stored motion information may be transmitted to the inter predictor 180 and used as the motion information of the spatial neighboring block or the motion information of the temporal neighboring block. The memory 170 may store reconstructed samples of reconstructed blocks in the current picture and may transfer the reconstructed samples to the intra predictor 185.

Overview of Image Decoding Apparatus

Figure 3:
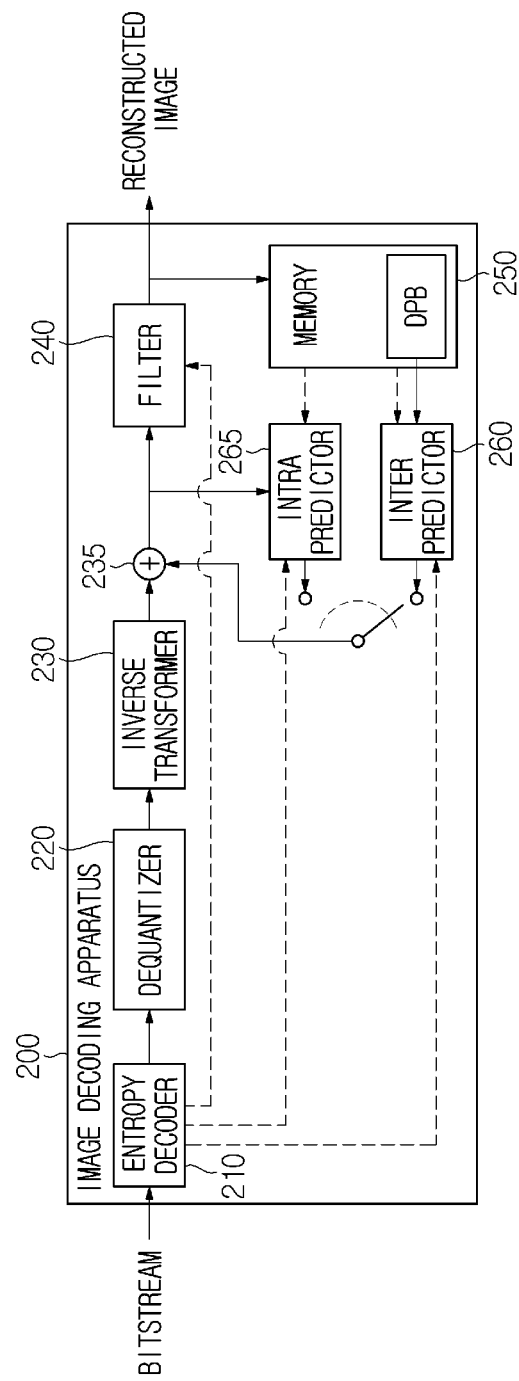
FIG. 3 is a view schematically showing an image decoding apparatus, to which an embodiment of the present disclosure is applicable.

FIG. 3 is a view schematically showing an image decoding apparatus, to which an embodiment of the present disclosure is applicable.

As shown in FIG. 3, the image reception device 200 may include an entropy decoder 210, a dequantizer 220, an inverse transformer 230, an adder 235, a filter 240, a memory 250, an inter predictor 260 and an intra predictor 265. The inter predictor 260 and the intra predictor 265 may be collectively referred to as a "predictor". The dequantizer 220 and the inverse transformer 230 may be included in a residual processor.

All or at least some of a plurality of components configuring the image reception device 200 may be configured by a hardware component (e.g., a decoder or a processor) according to an embodiment. In addition, the memory 250 may include a decoded picture buffer (DPB) or may be configured by a digital storage medium.

The image reception device 200, which has received a bitstream including video/image information, may reconstruct an image by performing a process corresponding to a process performed by the image source device 100 of FIG. 2. For example, the image reception device 200 may perform decoding using a processing unit applied in the image encoding apparatus. Thus, the processing unit of decoding may be a coding unit, for example. The coding unit may be acquired by partitioning a coding tree unit or a largest coding unit. The reconstructed image signal decoded and output through the image reception device 200 may be reproduced through a reproducing apparatus (not shown).

The image reception device 200 may receive a signal output from the image encoding apparatus of FIG. 2 in the form of a bitstream. The received signal may be decoded through the entropy decoder 210. For example, the entropy decoder 210 may parse the bitstream to derive information (e.g., video/image information) necessary for image reconstruction (or picture reconstruction). The video/image information may further include information on various parameter sets such as an adaptation parameter set (APS), a picture parameter set (PPS), a sequence parameter set (SPS), or a video parameter set (VPS). In addition, the video/image information may further include general constraint information. The image decoding apparatus may further decode picture based on the information on the parameter set and/or the general constraint information. Signalled/received information and/or syntax elements described in the present disclosure may be decoded through the decoding procedure and obtained from the bitstream. For example, the entropy decoder 210 decodes the information in the bitstream based on a coding method such as exponential Golomb coding, CAVLC, or CABAC, and output values of syntax elements required for image reconstruction and quantized values of transform coefficients for residual. More specifically, the CABAC entropy decoding method may receive a bin corresponding to each syntax element in the bitstream, determine a context model using a decoding target syntax element information, decoding information of a neighboring block and a decoding target block or information of a symbol/bin decoded in a previous stage, and perform arithmetic decoding on the bin by predicting a probability of occurrence of a bin according to the determined context model, and generate a symbol corresponding to the value of each syntax element. In this case, the CABAC entropy decoding method may update the context model by using the information of the decoded symbol/bin for a context model of a next symbol/bin after determining the context model. The information related to the prediction among the information decoded by the entropy decoder 210 may be provided to the predictor (the inter predictor 260 and the intra predictor 265), and the residual value on which the entropy decoding was performed in the entropy decoder 210, that is, the quantized transform coefficients and related parameter information, may be input to the dequantizer 220. In addition, information on filtering among information decoded by the entropy decoder 210 may be provided to the filter 240. Meanwhile, a receiver (not shown) for receiving a signal output from the image encoding apparatus may be further configured as an internal/external element of the image reception device 200, or the receiver may be a component of the entropy decoder 210.

Meanwhile, the image decoding apparatus according to the present disclosure may be referred to as a video/image/picture decoding apparatus. The image decoding apparatus may be classified into an information decoder (video/image/picture information decoder) and a sample decoder (video/image/picture sample decoder). The information decoder may include the entropy decoder 210. The sample decoder may include at least one of the dequantizer 220, the inverse transformer 230, the adder 235, the filter 240, the memory 250, the inter predictor 160 or the intra predictor 265.

The dequantizer 220 may dequantize the quantized transform coefficients and output the transform coefficients. The dequantizer 220 may rearrange transform the quantized coefficients in the form of a two-dimensional block. In this case, the rearrangement may be performed based on the coefficient scanning order performed in the image encoding apparatus. The dequantizer 220 may perform dequantization on the quantized transform coefficients by using a quantization parameter (e.g., quantization step size information) and obtain transform coefficients.

The inverse transformer 230 may inversely transform the transform coefficients to obtain a residual signal (residual block, residual sample array).

The predictor may perform prediction on the current block and generate a predicted block including prediction samples for the current block. The predictor may determine whether intra prediction or inter prediction is applied to the current block based on the information on the prediction output from the entropy decoder 210 and may determine a specific intra/inter prediction mode (prediction technique).

It is the same as described in the predictor of the image source device 100 that the predictor may generate the prediction signal based on various prediction methods (techniques) which will be described later.

The intra predictor 265 may predict the current block by referring to the samples in the current picture. The description of the intra predictor 185 is equally applied to the intra predictor 265.

The inter predictor 260 may derive a predicted block for the current block based on a reference block (reference sample array) specified by a motion vector on a reference picture. In this case, in order to reduce the amount of motion information transmitted in the inter prediction mode, motion information may be predicted in units of blocks, subblocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. For example, the inter predictor 260 may configure a motion information candidate list based on neighboring blocks and derive a motion vector of the current block and/or a reference picture index based on the received candidate selection information. Inter prediction may be performed based on various prediction modes, and the information on the prediction may include information indicating a mode of inter prediction for the current block.

The adder 235 may generate a reconstructed signal (reconstructed picture, reconstructed block, reconstructed sample array) by adding the obtained residual signal to the prediction signal (predicted block, predicted sample array) output from the predictor (including the inter predictor 260 and/or the intra predictor 265). If there is no residual for the block to be processed, such as when the skip mode is applied, the predicted block may be used as the reconstructed block. The description of the adder 155 is equally applicable to the adder 235. The adder 235 may be called a reconstructor or a reconstructed block generator. The generated reconstructed signal may be used for intra prediction of a next block to be processed in the current picture and may be used for inter prediction of a next picture through filtering as described below.

The filter 240 may improve subjective/objective image quality by applying filtering to the reconstructed signal. For example, the filter 240 may generate a modified reconstructed picture by applying various filtering methods to the reconstructed picture and store the modified reconstructed picture in the memory 250, specifically, a DPB of the memory 250. The various filtering methods may include, for example, deblocking filtering, a sample adaptive offset, an adaptive loop filter, a bilateral filter, and the like.

The (modified) reconstructed picture stored in the DPB of the memory 250 may be used as a reference picture in the inter predictor 260. The memory 250 may store the motion information of the block from which the motion information in the current picture is derived (or decoded) and/or the motion information of the blocks in the picture that have already been reconstructed. The stored motion information may be transmitted to the inter predictor 260 so as to be utilized as the motion information of the spatial neighboring block or the motion information of the temporal neighboring block. The memory 250 may store reconstructed samples of reconstructed blocks in the current picture and transfer the reconstructed samples to the intra predictor 265.

In the present disclosure, the embodiments described in the filter 160, the inter predictor 180, and the intra predictor 185 of the image source device 100 may be equally or correspondingly applied to the filter 240, the inter predictor 260, and the intra predictor 265 of the image reception device 200.

Overview of Image Partitioning

The video/image coding method according to the present disclosure may be performed based on an image partitioning structure as follows. Specifically, the procedures of prediction, residual processing ((inverse) transform, (de) quantization, etc.), syntax element coding, and filtering, which will be described later, may be performed based on a CTU, CU (and/or TU, PU) derived based on the image partitioning structure. The image may be partitioned in block units and the block partitioning procedure may be performed in the image partitioner 110 of the encoding apparatus. The partitioning related information may be encoded by the entropy encoder 190 and transmitted to the decoding apparatus in the form of a bitstream. The entropy decoder 210 of the decoding apparatus may derive a block partitioning structure of the current picture based on the partitioning related information obtained from the bitstream, and based on this, may perform a series of procedures (e.g., prediction, residual processing, block/picture reconstruction, in-loop filtering, etc.) for image decoding.

Figure 4:
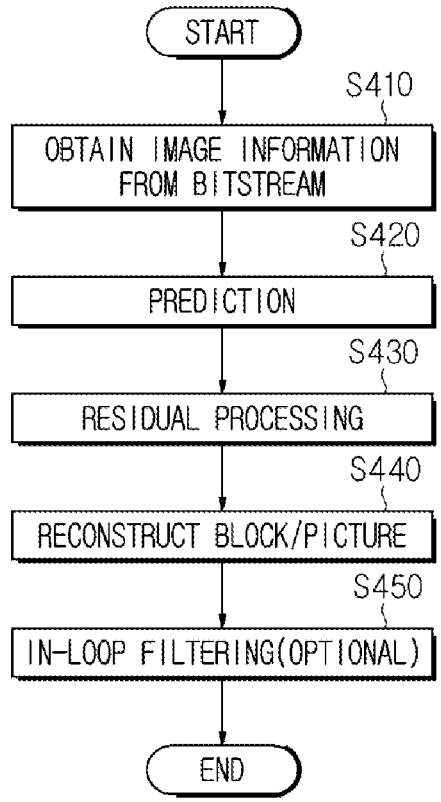
FIGS. 4 and 5 are views showing an example of a picture decoding and encoding procedure according to an embodiment.

Pictures may be partitioned into a sequence of coding tree units (CTUs). FIG. 4 shows an example in which a picture is partitioned into CTUs. The CTU may correspond to a coding tree block (CTB). Alternatively, the CTU may include a coding tree block of luma samples and two coding tree blocks of corresponding chroma samples. For example, for a picture that contains three sample arrays, the CTU may include an N×N block of luma samples and two corresponding blocks of chroma samples. A maximum allowable size of a CTU for coding and prediction may be different from a maximum allowable size of a CTU for transform. For example, a maximum allowable size of a luma block in a CTU may be 128×128 even if the maximum size of luma transform blocks is 64×64.

General Image/Video Coding Procedure

In image/video coding, a picture configuring an image/video may be encoded/decoded according to a decoding order. A picture order corresponding to an output order of the decoded picture may be set differently from the decoding order, and, based on this, not only forward prediction but also backward prediction may be performed during inter prediction.

FIG. 4 shows an example of a schematic picture decoding procedure, to which embodiment(s) of the present disclosure is applicable. In FIG. 4, S410 may be performed in the entropy decoder 210 of the decoding apparatus, S420 may be performed in a predictor including the intra predictor 265 and the inter predictor 260, S430 may be performed in a residual processor including the dequantizer 220 and the inverse transformer 230, S440 may be performed in the adder 235, and S450 may be performed in the filter 240. S410 may include the information decoding procedure described in the present disclosure, S420 may include the inter/intra prediction procedure described in the present disclosure, S430 may include a residual processing procedure described in the present disclosure, S440 may include the block/picture reconstruction procedure described in the present disclosure, and S450 may include the in-loop filtering procedure described in the present disclosure.

Referring to FIG. 4, the picture decoding procedure may schematically include a procedure (S410) for obtaining image/video information (through decoding) from a bitstream, a picture reconstruction procedure (S420 to S440) and an in-loop filtering procedure (S450) for a reconstructed picture. The picture reconstruction procedure may be performed based on prediction samples and residual samples obtained through inter/intra prediction (S420) and residual processing (S430) (dequantization and inverse transform of the quantized transform coefficient) described in the present disclosure. A modified reconstructed picture may be generated through the in-loop filtering procedure for the reconstructed picture generated through the picture reconstruction procedure, the modified reconstructed picture may be output as a decoded picture, stored in a decoded picture buffer or memory 250 of the decoding apparatus and used as a reference picture in the inter prediction procedure when decoding the picture later. In some cases, the in-loop filtering procedure may be omitted. In this case, the reconstructed picture may be output as a decoded picture, stored in a decoded picture buffer or memory 250 of the decoding apparatus, and used as a reference picture in the inter prediction procedure when decoding the picture later. The in-loop filtering procedure (S450) may include a deblocking filtering procedure, a sample adaptive offset (SAO) procedure, an adaptive loop filter (ALF) procedure and/or a bi-lateral filter procedure, as described above, some or all of which may be omitted. In addition, one or some of the deblocking filtering procedure, the sample adaptive offset (SAO) procedure, the adaptive loop filter (ALF) procedure and/or the bi-lateral filter procedure may be sequentially applied or all of them may be sequentially applied. For example, after the deblocking filtering procedure is applied to the reconstructed picture, the SAO procedure may be performed. Alternatively, for example, after the deblocking filtering procedure is applied to the reconstructed picture, the ALF procedure may be performed. This may be similarly performed even in the encoding apparatus.

Figure 5:
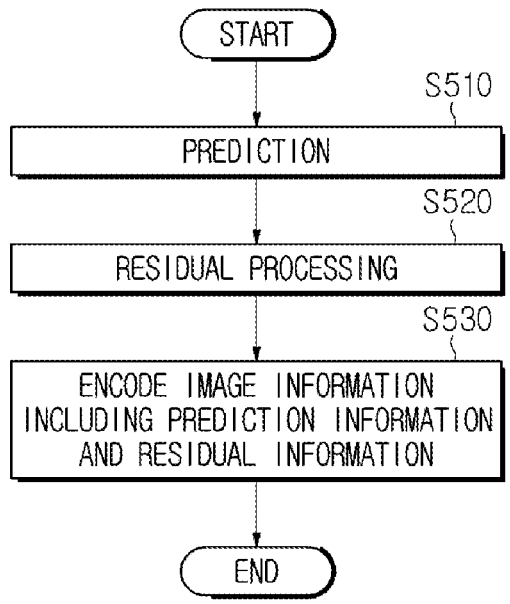

FIG. 5 shows an example of a schematic picture encoding procedure, to which embodiment(s) of the present disclosure is applicable. In FIG. 5, S510 may be performed in the predictor including the intra predictor 185 or inter predictor 180 of the encoding apparatus described above with reference to FIG. 2, S520 may be performed in a residual processor including the transformer 120 and/or the quantizer 130, and S530 may be performed in the entropy encoder 190. S510 may include the inter/intra prediction procedure described in the present disclosure, S520 may include the residual processing procedure described in the present disclosure, and S530 may include the information encoding procedure described in the present disclosure.

Referring to FIG. 5, the picture encoding procedure may schematically include not only a procedure for encoding and outputting information for picture reconstruction (e.g., prediction information, residual information, partitioning information, etc.) in the form of a bitstream but also a procedure for generating a reconstructed picture for a current picture and a procedure (optional) for applying in-loop filtering to a reconstructed picture, as described with respect to FIG. 2. The encoding apparatus may derive (modified) residual samples from a quantized transform coefficient through the dequantizer 140 and the inverse transformer 150, and generate the reconstructed picture based on the prediction samples which are output of S510 and the (modified) residual samples. The reconstructed picture generated in this way may be equal to the reconstructed picture generated in the decoding apparatus. The modified reconstructed picture may be generated through the in-loop filtering procedure for the reconstructed picture, may be stored in the decoded picture buffer or memory 170, and may be used as a reference picture in the inter prediction procedure when encoding the picture later, similarly to the decoding apparatus. As described above, in some cases, some or all of the in-loop filtering procedure may be omitted. When the in-loop filtering procedure is performed, (in-loop) filtering related information (parameter) may be encoded in the entropy encoder 190 and output in the form of a bitstream, and the decoding apparatus may perform the in-loop filtering procedure using the same method as the encoding apparatus based on the filtering related information.

Through such an in-loop filtering procedure, noise occurring during image/video coding, such as blocking artifact and ringing artifact, may be reduced and subjective/objective visual quality may be improved. In addition, by performing the in-loop filtering procedure in both the encoding apparatus and the decoding apparatus, the encoding apparatus and the decoding apparatus may derive the same prediction result, picture coding reliability may be increased and the amount of data to be transmitted for picture coding may be reduced.

As described above, the picture reconstruction procedure may be performed not only in the decoding apparatus but also in the encoding apparatus. A reconstructed block may be generated based on intra prediction/inter prediction in units of blocks, and a reconstructed picture including reconstructed blocks may be generated. When a current picture/slice/tile group is an I picture/slice/tile group, blocks included in the current picture/slice/tile group may be reconstructed based on only intra prediction. Meanwhile, when the current picture/slice/tile group is a P or B picture/slice/tile group, blocks included in the current picture/slice/tile group may be reconstructed based on intra prediction or inter prediction. In this case, inter prediction may be applied to some blocks in the current picture/slice/tile group and intra prediction may be applied to the remaining blocks. The color component of the picture may include a luma component and a chroma component and the methods and embodiments of the present disclosure are applicable to the luma component and the chroma component unless explicitly limited in the present disclosure.

Example of Coding Layer and Structure

A coded video/image according to the present disclosure may be processed, for example, according to a coding layer and structure which will be described below.

Figure 6:
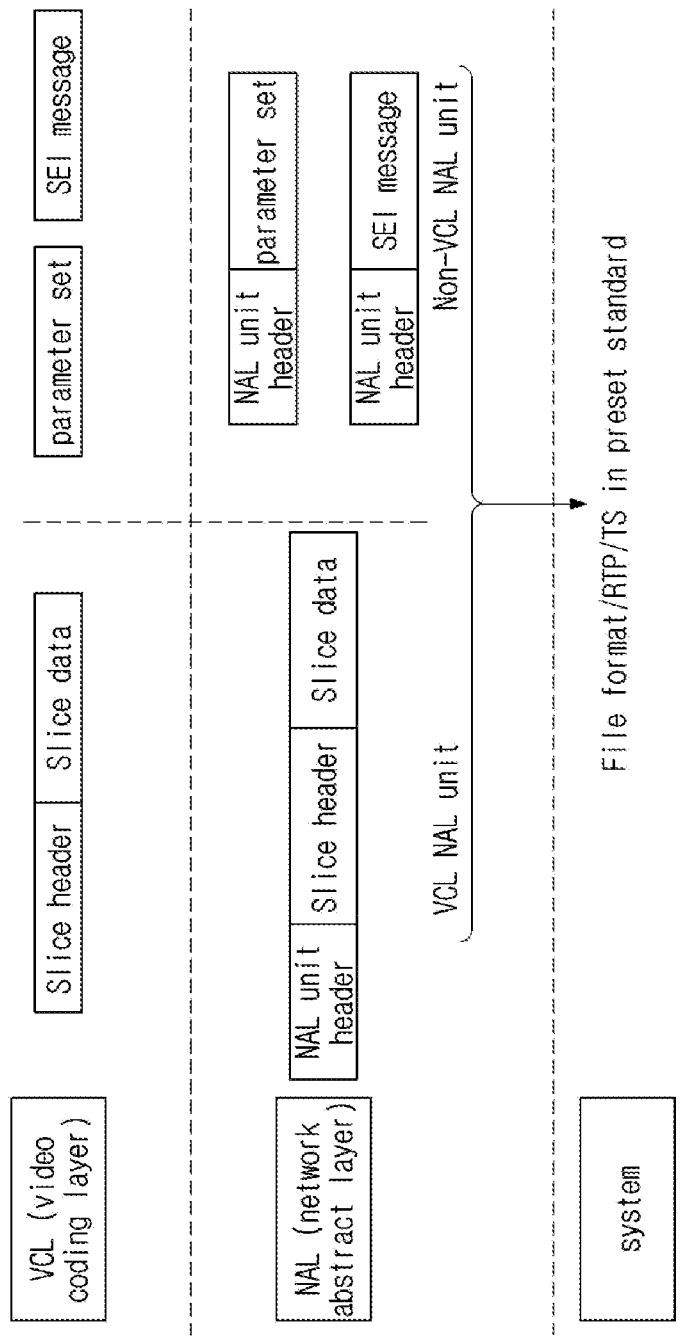
FIG. 6 is a view showing a layer structure for a coded image according to an embodiment.

FIG. 6 is a view showing a layer structure for a coded image. The coded image may be classified into a video coding layer (VCL) for an image decoding process and handling itself, a lower system for transmitting and storing encoded information, and a network abstraction layer (NAL) present between the VCL and the lower system and responsible for a network adaptation function.

In the VCL, VCL data including compressed image data (slice data) may be generated or a supplemental enhancement information (SEI) message additionally required for a decoding process of an image or a parameter set including information such as a picture parameter set (PPS), a sequence parameter set (SPS) or a video parameter set (VPS) may be generated.

In the NAL, header information (NAL unit header) may be added to a raw byte sequence payload (RBSP) generated in the VCL to generate an NAL unit. In this case, the RBSP refers to slice data, a parameter set, an SEI message generated in the VCL. The NAL unit header may include NAL unit type information specified according to RBSP data included in a corresponding NAL unit.

As shown in the figure, the NAL unit may be classified into a VCL NAL unit and a non-VCL NAL unit according to the RBSP generated in the VCL. The VCL NAL unit may mean a NAL unit including information on an image (slice data), and the Non-VCL NAL unit may mean a NAL unit including information (parameter set or SEI message) required to decode an image.

The VCL NAL unit and the Non-VCL NAL unit may be attached with header r information and transmitted through a network according to the data standard of the lower system. For example, the NAL unit may be modified into a data format of a predetermined standard, such as H.266/VVC file format, RTP (Real-time Transport Protocol) or TS (Transport Stream), and transmitted through various networks.

As described above, in the NAL unit, a NAL unit type may be specified according to the RBSP data structure included in the corresponding NAL unit, and information on the NAL unit type may be stored in a NAL unit header and signaled.

For example, this may be largely classified into a VCL NAL unit type and a non-VCL NAL unit type depending on whether the NAL unit includes information on an image (slice data). The VCL NAL unit type may be classified according to the property and type of the picture included in the VCL NAL unit, and the Non-VCL NAL unit type may be classified according to the type of a parameter set.

An example of the NAL unit type specified according to the type of the parameter set/information included in the Non-VCL NAL unit type will be listed below.

DCI (Decoding capability information) NAL unit: Type for NAL unit including DCI

VPS (Video Parameter Set) NAL unit: Type for NAL unit including VPS

SPS (Sequence Parameter Set) NAL unit: Type for NAL unit including SPS

PPS (Picture Parameter Set) NAL unit: Type for NAL unit including PPS

APS (Adaptation Parameter Set) NAL unit: Type for NAL unit including APS

PH (Picture header) NAL unit: Type for NAL unit including PH

The above-described NAL unit types may have syntax information for a NAL unit type, and the syntax information may be stored in a NAL unit header and signaled. For example, the syntax information may be nal_unit_type, and the NAL unit types may be specified as nal_unit_type values.

Meanwhile, as described above, one picture may include a plurality of slices, and one slice may include a slice header and slice data. In this case, one picture header may be further added to a plurality of slices (slice header and slice data set) in one picture. The picture header (picture header syntax) may include information/parameters commonly applicable to the picture.

The slice header (slice header syntax) may include information/parameters commonly applicable to the slice. The APS (APS syntax) or PPS (PPS syntax) may include information/parameters commonly applicable to one or more slices or pictures. The SPS (SPS syntax) may include information/parameters commonly applicable to one or more sequences. The VPS (VPS syntax) may information/parameters commonly applicable to multiple layers. The DCI (DCI syntax) may include information/parameters commonly applicable to an overall video. The DCI may include information/parameters related to decoding capability. In the present disclosure, a high level syntax (HLS) may include at least one of the APS syntax, the PPS syntax, the SPS syntax, the VPS syntax, the DCI syntax, the picture header syntax or the slice header syntax. Meanwhile, in the present disclosure, a low level syntax (LLS) may include, for example, a slice data syntax, a CTU syntax, a coding unit syntax, a transform unit syntax, etc.

In the present disclosure, image/video information encoded in the encoding apparatus and signaled to the decoding apparatus in the form of a bitstream may include not only in-picture partitioning related information, intra/inter prediction information, residual information, in-loop filtering information but also information on the slice header, information on the picture header, information on the APS, information on the PPS, information on the SPS, information on the VPS and/or information on the DCI. In addition, the image/video information may further include general constraint information and/or information on a NAL unit header.

Picture Information Signaling NAL Unit

Picture information may be signaled in units of NAL units. For example, picture information may be signaled as follows.

A sublayer is a temporal scalable layer of a temporal scalable bitstream, consisting of VCL NAL units with a particular value of the variable TemporalId and the associated non-VCL NAL units.

The variable TemporalId may be derived as follows:

TemporalId=nuh_temporal_id_plus1−1 where, the variable TemporalId may be derived as follows:

$$\text{TemporalId}=\text{nuh\_temporal\_id\_plus1}-1 \quad \text{[Equation 1]}$$

A syntax element nuh_temproal_id_plus1 for signaling the value of the variable TemporalId may be signalled through a NAL unit header of a NAL unit.

When the value of nal_unit_type in a NAL unit header is in the range of IDR_W_RADL to RSV_IRAP_12, inclusive, the value of TemporalId shall be equal to 0.

When the value of nal_unit_type is equal to STSA_NUT and the value of vps_independent_layer_flag[GeneralLayerIdx[nuh_layer_id]] is equal to 1, the value of TemporalId shall not be equal to 0.

The value of TemporalId shall be the same for all VCL NAL units of an AU. The value of TemporalId of a coded picture, a PU, or an AU is the value of the TemporalId of the VCL NAL units of the coded picture, PU, or AU.

The value of TemporalId of a sublayer representation is the greatest value of TemporalId of all VCL NAL units in the sublayer representation.

The value of TemporalId for non-VCL NAL units may be constrained as follows:

If nal_unit_type is equal to DCI_NUT, VPS_NUT, or SPS_NUT, TemporalId shall be equal to 0 and the value of TemporalId of the AU containing the NAL unit shall be equal to 0.

Otherwise, if nal_unit_type is equal to PH_NUT, the value of TemporalId shall be equal to the TemporalId of the PU containing the NAL unit.

Otherwise, if nal_unit_type is equal to EOS_NUT or EOB_NUT, TemporalId shall be equal to 0.

Otherwise, if nal_unit_type is equal to AUD_NUT, FD_NUT, PREFIX_SEI_NUT, or SUFFIX_SEI_NUT, TemporalId shall be equal to the TemporalId of the AU containing the NAL unit.

Otherwise, when nal_unit_type is equal to PPS_NUT, PREFIX_APS_NUT, or SUFFIX_APS_NUT, the value of TemporalId shall be greater than or equal to the value of TemporalId of the PU containing the NAL unit.

For example, when the NAL unit is a non-VCL NAL unit, the value of TemporalId may be equal to the minimum value of the TemporalId values of all AUs to which the non-VCL NAL unit applies. When the value of nal_unit_type is equal to PPS_NUT, PREFIX_APS_NUT, or SUFFIX_APS_NUT, the value of TemporalId may be greater than or equal to the value of TemporalId of the containing AU, as all PPSs and APSs may be included in the beginning of the bitstream (e.g., when they are transported out-of-band, and the receiver places them at the beginning of the bitstream). Here, the first coded picture may have TemporalId equal to 0.

In an embodiment, a coding picture obtained from a bitstream according to NAL unit information may be signalled by an encoding apparatus and identified by a decoding apparatus as follows. However, this is an example and the picture may be identified using other methods.

An intra random access point (IRAP) picture is a coded picture for which all VCL NAL units have the same value of nal_unit_type in the range of IDR_W_RADL to CRA_NUT, inclusive.

In an embodiment, an IRAP picture does not refer to any pictures other than itself for inter prediction in its decoding process. The IRAP picture may be a CRA picture or an IDR picture. The first picture in the bitstream in decoding order must be an IRAP or GDR picture. Provided the necessary parameter sets are available when they need to be referenced, the IRAP picture and all subsequent non-RASL pictures in the CVS in decoding order may be correctly decoded without performing the decoding process of any pictures that precede the IRAP picture in decoding order.

A clean random access (CRA) picture is an IRAP picture for which each VCL NAL unit has nal_unit_type equal to CRA_NUT.

For example, a CRA picture does not refer to any pictures other than itself for inter prediction in its decoding process, and may be the first picture in the bitstream in decoding order, or may appear later in the bitstream. A CRA picture may have associated RADL or RASL pictures. When a CRA picture has NoIncorrectPicOutputFlag equal to 1, the associated RASL pictures may not be output by the decoder, because they may not be decodable, as they may contain references to pictures that are not present in the bitstream. In an embodiment, when an incomplete picture is not output during image decoding, if a CRA picture is an incomplete picture, the CRA picture may have NoIncorrectPicOutputFlag equal to 1.

An instantaneous decoding refresh (IDR) picture is an IRAP picture for which each VCL NAL unit has nal_unit_type equal to IDR_W_RADL or IDR_N_LP.

For example, an IDR picture does not refer to any pictures other than itself for inter prediction in its decoding process. In addition, the IDR picture may be the first picture in the bitstream in decoding order, or may appear later in the bitstream. Each IDR picture is the first picture of a CVS in decoding order. When an IDR picture for which each VCL NAL unit has nal_unit_type equal to IDR_W_RADL, the IDR picture may have associated RADL pictures. When an IDR picture for which each VCL NAL unit has nal_unit_type equal to IDR_N_LP, the IDR picture does not have any associated leading pictures. An IDR picture does not have associated RASL pictures.

A random access decodable leading (RADL) picture is a coded picture for which each VCL NAL unit has nal_unit_type equal to RADL_NUT.

In an embodiment, all RADL pictures are leading pictures. RADL pictures are not used as reference pictures for the decoding process of trailing pictures of the same associated IRAP picture. When a syntax element field_seq_flag obtained from the bitstream is equal to 0, all RADL pictures, when present, precede, in decoding order, all non-leading pictures of the same associated IRAP picture.

A random access skipped leading (RASL) picture may be a coded picture for which each VCL NAL unit has nal_unit_type equal to RASL_NUT.

In an embodiment, all RASL pictures are leading pictures of an associated CRA picture. When the associated CRA picture has NoIncorrectPicOutputFlag equal to 1, the RASL picture is not output and may not be correctly decodable, as the RASL picture may contain references to pictures that are not present in the bitstream. RASL pictures are not used as reference pictures for the decoding process of non-RASL pictures. When field_seq_flag is equal to 0, all RASL pictures, when present, precede, in decoding order, all non-leading pictures of the same associated CRA picture.

A trailing picture is a non-IRAP picture that follows the associated IRAP picture in output order and that is not an STSA picture.

Trailing pictures associated with an IRAP picture also follow the IRAP picture in decoding order. Pictures that follow the associated IRAP picture in output order and precede the associated IRAP picture in decoding order are not allowed.

A gradual decoding refresh (GDR) picture is a picture for which each VCL NAL unit has nal_unit_type equal to GDR_NUT.

A step-wise temporal sublayer access (STSA) picture is a coded picture for which each VCL NAL unit has nal_unit_type equal to STSA_NUT.

An STSA picture may not use pictures with the same TemporalId as the STSA picture for inter prediction reference. Pictures following an STSA picture in decoding order with the same TemporalId as the STSA picture may not use pictures prior to the STSA picture in decoding order with the same TemporalId as the STSA picture for inter prediction reference.

An STSA picture enables up-switching, at the STSA picture, to the sublayer containing the STSA picture, from the immediately lower sublayer. STSA pictures must have TemporalId greater than 0.

Ain an embodiment, for a single-layer or a multi-layer bitstream, the one or more following constraints may apply:

Each picture, other than the first picture in the bitstream in decoding order, may be considered to be associated with the previous IRAP picture in decoding order.

When a picture is a leading picture of an IRAP picture, it shall be a RADL or RASL picture.

When a picture is a trailing picture of an IRAP picture, it shall not be a RADL or RASL picture.

No RASL pictures shall be present in the bitstream that are associated with an IDR picture.

No RADL pictures shall be present in the bitstream that are associated with an IDR picture having nal_unit_type equal to IDR_N_LP.

(For example, it is possible to perform random access at the position of an IRAP PU by discarding all PUs before the IRAP PU and to correctly decode the IRAP picture and all the subsequent non-RASL pictures in decoding order, provided each parameter set is available either in the bitstream or by external means when it is referenced.)

Any picture that precedes an IRAP picture in decoding order shall precede the IRAP picture in output order and shall precede any RADL picture associated with the IRAP picture in output order.

Any RASL picture associated with a CRA picture shall precede any RADL picture associated with the CRA picture in output order.

Any RASL picture associated with a CRA picture shall follow, in output order, any IRAP picture that precedes the CRA picture in decoding order.

If field_seq_flag is equal to 0 and the current picture is a leading picture associated with an IRAP picture, it shall precede, in decoding order, all non-leading pictures that are associated with the same IRAP picture. Otherwise, let picA and picB be the first and the last leading pictures, in decoding order, associated with an IRAP picture, respectively, there shall be at most one non-leading picture preceding picA in decoding order, and there shall be no non-leading picture between picA and picB in decoding order.

Multi-Layer Based Coding

Figure 7:
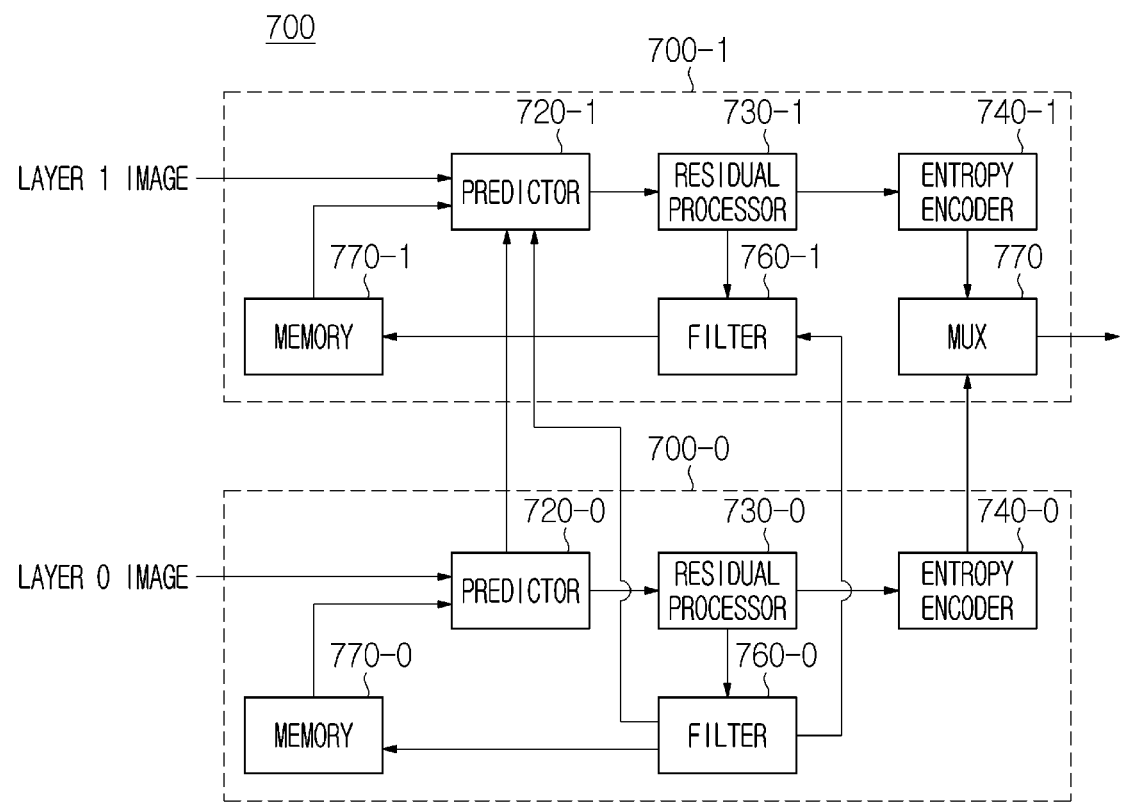
FIGS. 7 to 8 are views illustrating multi-layer based encoding and decoding.

Image/video coding according to the present disclosure may include multi-layer based image/video coding. The multi-layer based image/video coding may include scalable coding. In multi-layer based coding or scalable coding, input signals may be processed for each layer. According to the layer, input signals (input images/videos) may have different values in terms of at least one of resolution, frame rate, bit-depth, color format, aspect ratio or view. In this case, it is possible to reduce redundant information transmission/ processing and to increase compression efficiency, by performing inter-layer prediction using a difference between layers (e.g., based on scalability). FIG. 7 is a schematic block diagram of a multi-layer encoding apparatus 700, to which embodiment(s) of the present disclosure is applicable, and, in which encoding of a multi-layer video/image signal is performed.

The multi-layer encoding apparatus 700 of FIG. 7 may include the encoding apparatus of FIG. 2. Compared to FIG. 2, the image partitioner 110 and the adder 155 are not shown in the multi-layer encoding apparatus 700 of FIG. 7, the multi-layer encoding apparatus 700 may include the image partitioner 110 and the adder 155. In an embodiment, the image partitioner 110 and the adder 155 may be included in unit of layer. Hereinafter, multi-layer based prediction will be focused upon in the description of FIG. 7. For example, in addition to the following description, the multi-layer encoding apparatus 700 may include the technical idea of the encoding apparatus described above with reference to FIG. 2.

For convenience of description, a multi-layer structure consisting of two layers is shown in FIG. 7. However, the embodiments of the present disclosure are not limited to two layers and the multi-layer structure, to which the embodiment of the present disclosure is applied, may include two or more layers.

Referring to FIG. 7, the encoding apparatus 700 includes an encoder 700-1 of layer 1 and an encoder 700-0 of layer 0. Layer 0 may be a base layer, a reference layer or a lower layer, and layer 1 may be an enhancement layer, a current layer or a higher layer.

The encoder 700-1 of layer 1 may include a predictor 720-1, a residual processor 730-1, a filter 760-1, a memory 770-1, an entropy encoder 740-1 and a multiplexer (MUX) 770. In an embodiment, the MUX may be included as an external component.

The encoder 700-0 of layer 0 may include a predictor 720-0, a residual processor 730-0, a filter 760-0, a memory 770-0 and an entropy encoder 740-0.

The predictors 720-0 and 720-1 may perform prediction with respect to input images based on various prediction schemes as described above. For example, the predictors 720-0 and 720-1 may perform inter prediction and intra prediction. The predictors 720-0 and 720-1 may perform prediction in a predetermined processing unit. The prediction unit may be a coding unit (CU) or a transform unit (TU). A predicted block (including prediction samples) may be generated according to the result of prediction and, based on this, the residual processor may derive a residual block (including residual samples).

Through inter prediction, prediction may be performed based on information on at least one of a previous picture and/or a next picture of a current picture, thereby generating a prediction block. Through intra prediction, prediction may be performed based on neighboring samples in a current picture, thereby generating a prediction block.

As an inter prediction mode or method, the above-described various prediction modes or methods may be used. In inter prediction, a reference picture may be selected for a current block to be predicted, and a reference block corresponding to the current block may be selected from the reference picture. The predictors 720-0 and 720-1 may generate a predicted block based on the reference block.

In addition, the predictor 720-1 may perform prediction for layer 1 using information on layer 0. In the present disclosure, a method of predicting information on a current layer using information on another layer is referred to as inter-layer prediction, for convenience of description.

Information on a current layer predicted using information on another layer (e.g., predicted by inter-layer prediction) may be at least one of texture, motion information, unit information or a predetermined parameter (e.g., a filtering parameter, etc.).

In addition, information on another layer used for prediction of the current layer (e.g., used for inter-layer prediction) may be at least one of texture, motion information, unit information or a predetermined parameter (e.g., a filtering parameter, etc.).

Inter-layer prediction, a current block may be a block in a current picture in a current layer (e.g., layer 1) and may be a block to be coded. A reference block is a block in a picture (reference picture) belonging to the same access unit (AU) as a picture (current picture), to which the current block belongs, on a layer (reference layer, e.g., layer 0) referred to for prediction of the current block, and may be a block corresponding to the current block.

As an example of inter-layer prediction, there is inter-layer motion prediction for predicting motion information of a current layer using motion information of a reference layer. According to inter-layer motion prediction, motion information of a current block may be predicted using motion information of a reference block. That is, in deriving motion information according to the inter prediction mode which will be described below, a motion information candidate may be derived based on motion information of an inter-layer reference block instead of a temporal neighboring block.

When inter-layer motion prediction is applied, the predictor 720-1 may scale and use reference block (that is, inter-layer reference block) motion information of the reference layer.

As another example of inter-layer prediction, inter-layer texture prediction may use texture of a reconstructed reference block as a prediction value for a current block. In this case, the predictor 720-1 may scale the texture of the reference block by up-scaling. Inter-layer texture prediction may be referred to as inter-layer (reconstructed) sample prediction or simply inter-layer prediction.

In inter-layer parameter prediction which is another example of inter-layer prediction, a derived parameter of a reference layer may be reused in a current layer or a parameter for a current layer may be derived based on a parameter used in a reference layer.

In inter-layer residual prediction which is another example of inter-layer prediction, residual information of a current layer may be predicted using residual information of another layer and, based on this, prediction of a current block may be performed.

In inter-layer difference prediction which is another example of inter-layer prediction, prediction of a current block may be performed using a difference between images obtained by up-sampling or down-sampling a reconstructed picture of a current layer and a reconstructed picture of a reference layer.

In inter-layer syntax prediction which is another example of inter-layer prediction, texture of a current block may be predicted or generated using syntax information of a reference layer. In this case, syntax information of a referenced reference layer may include information on an intra prediction mode and motion information.

A plurality of prediction methods using the above-described inter-layer may be used when predicting a particular block.

Here, as an example of inter-layer prediction, although inter-layer texture prediction, inter-layer motion prediction, inter-layer unit information prediction, inter-layer parameter prediction, inter-layer residual prediction, inter-layer difference prediction, inter-layer syntax prediction, etc. are described, inter-layer prediction applicable in the present disclosure is not limited thereto.

For example, inter-layer prediction may be applied as an extension of inter prediction for a current layer. That is, by including a reference picture derived from a reference layer in reference pictures capable of being referenced for inter prediction of a current block, it is possible to perform inter prediction for the current block.

In this case, the inter-layer reference picture may be included in a reference picture list for the current block. The predictor 720-1 may perform inter prediction for the current block using an inter-layer reference picture.

Here, the inter-layer reference picture may be a reference picture constructed by sampling the reconstructed picture of a reference layer to correspond to the current layer. Accordingly, when the reconstructed picture of the reference layer corresponds to the picture of the current layer, the reconstructed picture of the reference layer may be used as an inter-layer reference picture without sampling. For example, when the widths and heights of samples are the same in the reconstructed picture of the reference layer and the reconstructed picture of the current layer and an offset between the top left end, top right end, bottom left end and bottom right end in the picture of the reference layer and the top left end, top right end, bottom left end and bottom right end in the picture of the current layer is 0, the reconstructed picture of the reference layer may be used as the inter-layer reference picture of the current layer without being sampled again.

In addition, the reconstructed picture of the reference layer, from which the inter-layer reference picture is derived, may be a picture belonging to the same AU as the current picture to be encoded.

When inter prediction for a current block is performed by including an inter-layer reference picture in a reference picture list, the position of the inter-layer reference picture in the reference picture list may be different between reference picture lists L0 and L1. For example, in reference picture list L0, the inter-layer reference picture may be located after short-term reference pictures before the current picture and, in reference picture list L1, the inter-layer reference picture may be located at the end of the reference picture list.

Here, reference picture list L0 is a reference picture list used for inter prediction of P slice or a reference picture list used as a first reference picture list in inter prediction of B slice. Reference picture list L1 may be a second reference picture list used for inter prediction of B slice.

Accordingly, reference picture list L0 may consist of short-term reference picture(s) before the current picture, an inter-layer reference picture, short-term reference picture(s) after the current picture and a long-term reference picture in this order. Reference picture list L1 may consist of short-term reference picture(s) after the current picture, short-term reference picture(s) before the current picture, a long-term reference picture and an inter-layer reference picture in this order.

In this case, a predictive (P) slice is a slice for which intra prediction is performed or inter prediction is performed using a maximum of one motion vector per prediction block and a reference picture index. A bi-predictive (B) slice is a slice for which intra prediction is performed or prediction is performed using a maximum of two motion vectors per prediction block and a reference picture index. In this regard, an intra (I) slice is a slice to which only intra prediction is applied.

In addition, when inter prediction for a current block is performed based on a reference picture list including an inter-layer reference picture, the reference picture list may include a plurality of inter-layer reference pictures derived from a plurality of layers.

When a plurality of inter-layer reference pictures is included, the inter-layer reference pictures may be alternately arranged in reference picture lists L0 and L1. For example, assume that two inter-layer reference pictures such as inter-layer reference picture ILRPi and inter-layer reference picture ILRPj are included in the reference picture list used for inter prediction of the current block. In this case, in reference picture list L0, ILRPi may be located after short-term reference pictures before the current picture and ILRPj may be located at the end of the list. In addition, in reference picture list L1, ILRPi may be located at the end of the list and ILRPj may be located after short-term reference pictures after the current picture.

In this case, reference picture list L0 may consist of short-term reference picture(s) before the current picture, an inter-layer reference picture ILRPi, short-term reference picture(s) after the current picture, a long-term reference picture and an inter-layer reference picture ILRPj in this order. Reference picture list L1 may consist of short-term reference picture(s) after the current picture, an inter-layer reference picture ILRPj, short-term reference picture(s) before the current picture, a long-term reference picture and an inter-layer reference picture ILRPi in this order.

In addition, one of two inter-layer reference pictures may be an inter-layer reference picture derived from a scalable layer for resolution and the other may be an inter-layer reference picture derived from a layer for providing another view. In this case, for example, if ILRPi is an inter-layer reference picture derived from a layer for providing different resolution and ILRPj is an inter-layer reference picture derived from a layer for providing a different view, in the case of scalable video coding supporting only scalability excluding a view, reference picture list L0 may consist of short-term reference picture(s) before the current picture, an inter-layer reference picture ILRPi, short-term reference picture(s) after the current picture, and a long-term reference picture in this order, and reference picture list L1 may consist of short-term reference picture(s) after the current picture, short-term reference picture(s) before the current picture, a long-term reference picture and an inter-layer reference picture ILRPi in this order.

Meanwhile, in inter-layer prediction, as information on an inter-layer reference picture, only a sample value may be used, only motion information (motion vector) may be used or both a sample value and motion information may be used. The predictor 720-1 may use only a sample vale of the inter-layer reference picture, may use only motion information (motion vector) of the inter-layer reference picture or may use both the sample value and motion information of the inter-layer reference picture according to information received from the encoding apparatus, when the reference picture index indicates an inter-layer reference picture.

When only the sample value of the inter-layer reference picture is used, the predictor 720-1 may derive samples of a block specified by a motion vector from the inter-layer reference picture as a prediction sample of a current block. In the case of scalable video coding which does not take a view into consideration, a motion vector in inter prediction (inter-layer prediction) using an inter-layer reference picture may be set to a fixed value (e.g., 0).

When only the motion information of the inter-layer reference picture is used, the predictor 720-1 may use a motion vector specified by the inter-layer reference picture as a motion vector predictor for deriving the motion vector of the current block. In addition, the predictor 720-1 may use a motion vector specified by the inter-layer reference picture as the motion vector of the current block.

When both the sample value and motion information of the inter-layer reference picture are used, the predictor 720-1 may use, for prediction of the current block, a sample of a region corresponding to the current block in the inter-layer reference picture and motion information (motion vector) specified in the inter-layer reference picture.

The encoding apparatus may transmit a reference index indicating an inter-layer reference picture in a reference picture list to the decoding apparatus, when inter-layer prediction is applied, and may transmit, to the decoding apparatus, information for specifying which information (sample information, motion information or sample information and motion information) is used from the inter-layer reference picture, that is, information for specifying a dependency type of dependency for inter-layer prediction between two layers.

Figure 8:
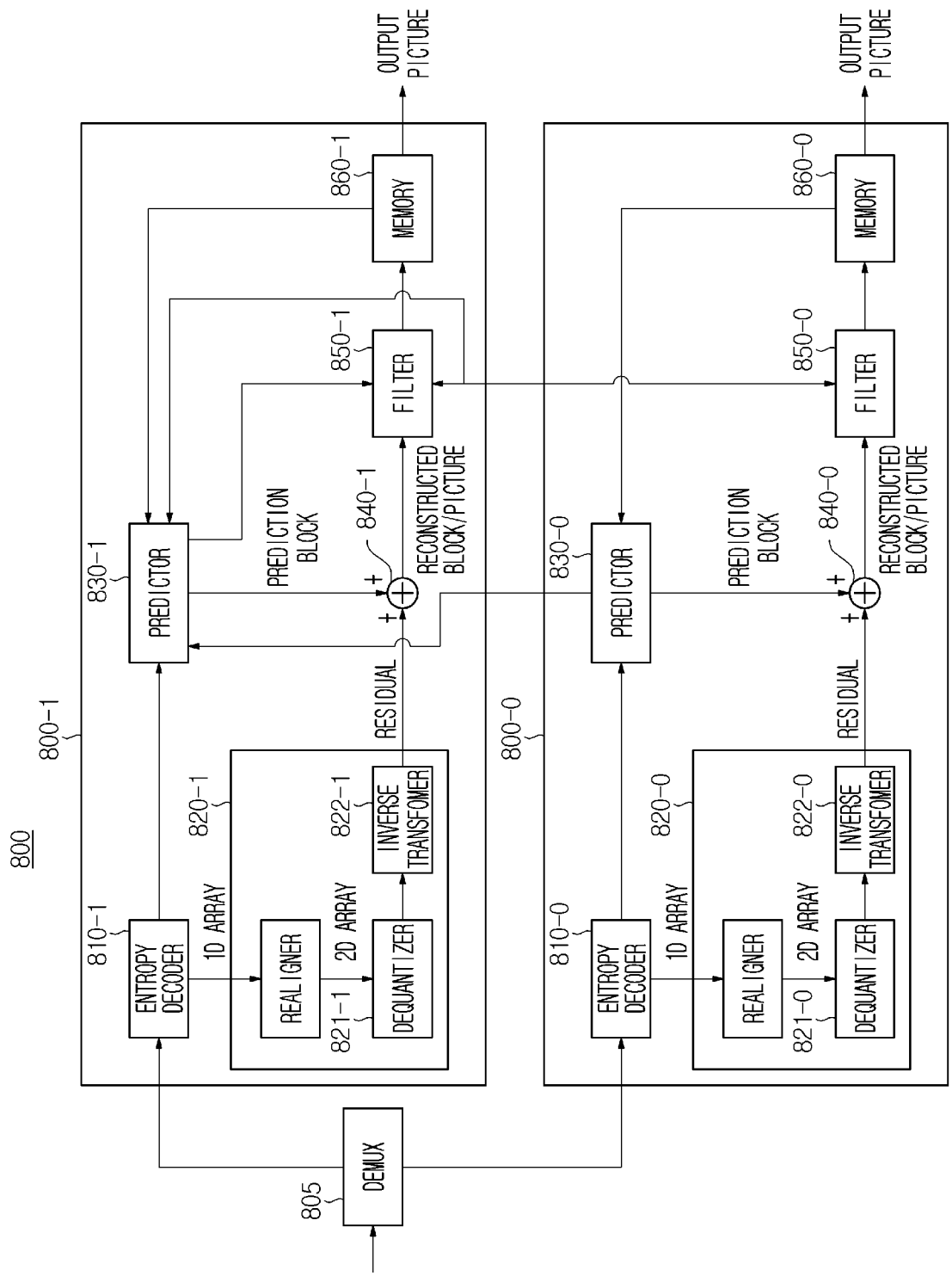

FIG. 8 is a schematic block diagram of a decoding apparatus, to which embodiment(s) of the present disclosure is applicable, and, in which decoding of a multi-layer video/image signal is performed. The decoding apparatus of FIG. 8 may include the decoding apparatus of FIG. 3. A realigner shown in FIG. 8 may be omitted or included in a dequantizer. In the description of this drawing, multi-layer based prediction will be focused upon. In addition, the description of the decoding apparatus of FIG. 3 may be included.

In the example of FIG. 8, for convenience of description, a multi-layer structure consisting of two layers will be described. However, it should be noted that embodiments of the present disclosure are not limited thereto, and the multi-layer structure, to which the embodiment of the present disclosure is applied, may include two or more layers.

Referring to FIG. 8, the decoding apparatus 800 may include a decoder 800-1 of layer 1 and a decoder 800-0 of layer 1. The decoder 800-1 of layer 1 may include an entropy decoder 810-1, a residual processor 820-1, a predictor 830-1, an adder 840-1, a filter 850-1 and a memory 860-1. The decoder 800-2 of layer 0 may include an entropy decoder 810-0, a residual processor 820-0, a predictor 830-0, an adder 840-0, a filter 850-0 and a memory 860-0.

When a bitstream including image information is received from the encoding apparatus, a DEMUX 805 may demultiplex information for each layer and transmit the information to the decoding apparatus for each layer.

The entropy decoders 810-1 and 810-0 may perform decoding in correspondence with a coding method used in the encoding apparatus. For example, when CABAC is used in the encoding apparatus, the entropy decoders 810-1 and 810-0 may perform entropy decoding using CABAC.

When a prediction mode for a current block is an intra prediction mode, the predictors 830-1 and 830-0 may perform intra prediction for the current block based on neighboring reconstructed samples in the current picture.

When an prediction mode for a current block is an inter prediction mode, the predictors 830-1 and 830-0 may perform inter prediction for the current block based on information included in at least one of picture before or after the current picture. Some or all of motion information necessary for inter prediction may be derived by checking information received from the encoding apparatus.

When a skip mode is applied as an inter prediction mode, residual is not transmitted from the encoding apparatus and a prediction block may be a reconstructed block.

Meanwhile, the predictor 830-1 of layer 1 may perform inter prediction or intra prediction using only information on layer 1 and perform inter-layer prediction using information on another layer (layer 0).

As information on a current layer predicted using information on another layer (e.g., predicted by inter-layer prediction), there may be at least one of texture, motion information, unit information, a predetermined parameter (e.g., a filtering parameter, etc.).

As information on another layer used for prediction of the current layer (e.g., used for inter-layer prediction), there may be at least one of texture, motion information, unit information, a predetermined parameter (e.g., a filtering parameter, etc.).

In inter-layer prediction, a current block may be a block in a current picture in a current layer (e.g., layer 1) and may be a block to be decoded. A reference block may be a block in a picture (reference picture) belonging to the same access unit (AU) as a picture (current picture), to which the current block belongs, on a layer (reference layer, e.g., layer 0) referenced for prediction of the current block and may be a block correspond to the current block.

The multi-layer decoding apparatus 800 may perform inter-layer prediction as described in the multi-layer encoding apparatus 700. For example, the multi-layer decoding apparatus 800 may perform inter-layer texture prediction, inter-layer motion prediction, inter-layer unit information prediction, inter-layer parameter prediction, inter-layer residual prediction, inter-layer difference prediction, inter-layer syntax prediction, etc., The multi-layer decoding apparatus 800 may perform inter-layer prediction as described and inter-layer prediction applicable in the present disclosure is not limited thereto.

The predictor 830-1 may perform inter-layer prediction using an inter-layer reference picture, when a reference picture index received from the encoding apparatus or a reference picture index derived from a neighboring block indicates an inter-layer reference picture in a reference picture list. For example, the predictor 830-1 may derive a sample value of a region specified by a motion vector in the inter-layer reference picture as a prediction block for a current block, when a reference picture index indicates an inter-layer reference picture.

In this case, the inter-layer reference picture may be included in a reference picture list for a current block. The predictor 830-1 may perform inter prediction for the current block using the inter-layer reference picture.

As described above in the multi-layer encoding apparatus 700, in operation of the multi-layer decoding apparatus 800, the inter-layer reference picture may be a reference picture constructed by sampling a reconstructed picture of a reference layer to correspond to a current layer. Processing for the case where the reconstructed picture of the reference layer corresponds to the picture of the current layer may be performed in the same manner as the encoding process.

In addition, as described above in the multi-layer encoding apparatus 700, in operation of the multi-layer decoding apparatus 800, a reconstructed picture of a reference layer, from which an inter-layer reference picture is derived, may be a picture belonging to the same AU as a current picture to be encoded.

In addition, as described above in the multi-layer encoding apparatus 700, in operation of the multi-layer decoding apparatus 800, when inter prediction for a current block is performed by including the inter-layer reference picture in a reference picture list, the position of the inter-layer reference picture in the reference picture list may be different between reference picture lists L0 and L1.

In addition, as described above in the multi-layer encoding apparatus 700, in operation of the multi-layer decoding apparatus 800, when inter prediction for a current block is performed based on a reference picture list including an inter-layer reference picture, the reference picture list may include a plurality of inter-layer reference pictures derived from a plurality of layers, and arrangement of inter-layer reference pictures may be performed to correspond to that described in the encoding process.

In addition, as described above in the multi-layer encoding apparatus 700, in operation of the multi-layer decoding apparatus 800, as information on an inter-layer reference picture, only a sample value may be used, only motion information (motion vector) may be used or both a sample value and motion information may be used.

The multi-layer decoding apparatus 800 may receive a reference index indicating an inter-layer reference picture in a reference picture list from the multi-layer encoding apparatus 700 and perform inter-layer prediction based on the same. In addition, the multi-layer decoding apparatus 800 may receive, from the multi-layer encoding apparatus 700, information for specifying which information (sample information, motion information or sample information and motion information) is used from the inter-layer reference picture, that is, information for specifying a dependency type of dependency for inter-layer prediction between two layers.

High Level Syntax (HLS) Signaling and Semantics

As described above, a HLS may be encoded and/or signaled for video and/or image encoding. As described above, the video/image information of the present t disclosure may be included in the HLS. In addition, the image/video encoding method may be performed based on such image/video information.

Video Parameter Set Signaling

A video parameter set (VPS) is a parameter set which is used for the of layer information. The layer information may include, for example, information on an output layer set (OLS), information on a profile tier level, information on a relationship between an OLS and a hypothetical reference decoder and information on a relationship between an OLS and a decoded picture buffer (DPB). The VPS may not be essential for decoding of a bitstream. A VPS raw byte sequence payload (RBSP) shall be available to a decoding process prior to it being referenced, included in at least one access unit (AU) with TemporalId equal to 0 or provided through external means. All VPS NAL units with a particular value of vps_video_parameter_set_id in a coded video sequence (CVS) shall have the same content.

FIG. 9 is a view illustrating a syntax structure of a VPS according to an embodiment of the present disclosure. Hereinafter, the syntax element of FIG. 9 will be described.

vps_video_parameter_set_id provides an identifier for the VPS. Other syntax elements may refer to the VPS using vps_video_parameter_set_id. The value of vps_video_parameter_set_id shall be greater than 0.

vps_max_layers_minus1 may specify the maximum allowed number of layers in each CVS referring to the VPS.

For example, vps_max_layers_minus1 plus 1 may specify the maximum allowed number of layers in each CVS referring to the VPS.

vps_max_sublayers_minus1 plus 1 may specify the maximum number of temporal sublayers that may be present in a layer in each CVS referring to the VPS.

vps_all_layers_same_num_sublayers_flag equal to 1 may specify that the number of temporal sublayers is the same for all the layers in each CVS referring to the VPS. vps_all_layers_same_num_sublayers_flag equal to 0 may specify that the number of temporal sublayers may be the same or different for the layers in each CVS referring to the VPS. When the value of vps_all_layers_same_num_sublayers_flag is not provided in a bitstream, the value of vps_all_layers_same_num_sublayers_flag may be inferred to be equal to 1.

vps_all_independent_layers_flag equal to 1 may specify that all layers in the CVS are independently coded without using inter-layer prediction. vps_all_independent_layers_flag equal to 0 may specify that one or more of the layers in the CVS may be coded using inter-layer prediction.

vps_layer_id[i] may specify the nuh_layer_id value of the i-th layer. For any two non-negative integer values of m and n, when m is less than n, the value of vps_layer_id[m] shall be less than vps_layer_id[n]. Here, nuh_layer_id is a syntax element signalled in a NAL unit header, and may specify the identifier of the NAL unit.

vps_independent_layer_flag[i] equal to 1 may specify that the layer with index i does not use inter-layer prediction. vps_independent_layer_flag[i] equal to 0 may specify that the layer with index i may use inter-layer prediction and the syntax elements vps_direct_ref_layer_flag[i][j] may be obtained from the VPS. Here, j may be in the range of 0 to i−1, inclusive. When the value of vps_independent_layer_flag[i] is not present in a bitstream, the value of vps_independent_layer_flag[i] may be inferred to be equal to 1.

vps_direct_ref_layer_flag[i][j] equal to 0 may specify that the layer with index j is not a direct reference layer for the layer with index i. vps_direct_ref_layer_flag[i][j] equal to 1 may specify that the layer with index j is a direct reference layer for the layer with index i. When the value of vps_direct_ref_layer_flag[i][j] is not obtained from the bitstream for i and j in the range of 0 to vps_max_layers_minus1, inclusive, the value thereof may be inferred to be equal to 0. When vps_independent_layer_flag[i] is equal to 0, there shall be at least one value of j in the range of 0 to i−1, inclusive, such that the value of vps_direct_ref_layer_flag[i][j] is equal to 1.

In an embodiment, the variables NumDirectRefLayers[i], DirectRefLayerIdx[i][d], NumRefLayers[i], RefLayerIdx[i][r], and LayerUsedAsRefLayerFlag[j] are derived using the pseudo code of FIG. 10.

The variable GeneralLayerIdx[i], specifying the layer index of the layer with nuh_layer_id equal to vps_layer_id[i], may be derived as shown in the following equation.

$$\text{for } (i=0; i<=\text{vps\_max\_layers\_minus1}; i++)$$

$$\text{GeneralLayerIdx}[\text{vps\_layer\_id}[i]]=i \qquad \text{[Equation 2]}$$

max_tid_ref_present_flag[i] equal to 1 may specify that the syntax element max_tid_il_ref_pics_plus1[i] is provided from the bitstream. max_tid_ref_present_flag[i] equal to 0 may specify that the syntax element max_tid_il_ref_pics_plus1[i] is not provided from the bitstream.

max_tid_il_ref_pics_plus1[i] equal to 0 may specify that inter-layer prediction is not used by non-IRAP pictures of the i-th layer. max_tid_il_ref_pics_plus1[i] greater than 0 may specify that, for decoding pictures of the i-th layer, no picture with TemporalId greater than max_tid_il_ref_pics_plus1[i]−1 is used as ILRP (inter-layer reference picture). When the value of max_tid_il_ref_pics_plus1[i] is not obtained d from the bitstream, the value of max_tid_il_ref_pics_plus1[i] may be inferred to be equal to 7.

A syntax element each_layer_is_an_ols_flag equal to 1 may specify that each OLS contains only one layer and each layer itself in a CVS referring to the VPS is an OLS with the single included layer being the only output layer. each_layer_is_an_ols_flag equal to 0 may specify that an OLS may contain more than one layer. In an embodiment, if vps_max_layers_minus1 is equal to 0, the value of each_layer_is_an_ols_flag may be inferred to be equal to 1. Otherwise, when vps_all_independent_layers_flag is equal to 0, the value of each_layer_is_an_ols_flag may be inferred to be equal to 0.

ols_mode_idc equal to 0 may specify that the total number of OLSs specified by the VPS is equal to vps_max_layers_minus1+1. The i-th OLS may include the layers with layer indices from 0 to i, inclusive, and, for each OLS, only the highest layer in the OLS may be output.

ols_mode_idc equal to 1 may specify that the total number of OLSs specified by the VPS is equal to vps_max_layers_minus1+1. The i-th OLS may include the layers with layer indices from 0 to i, inclusive, and for each OLS all layers in the OLS may be output.

ols_mode_idc equal to 2 may specify that the total number of OLSs specified by the VPS is explicitly signalled and for each OLS the output layers are explicitly signaled and other layers are the layers that are direct or indirect reference layers of the output layers of the OLS.

The value of ols_mode_idc shall be in the range of 0 to 2, inclusive. The value 3 of ols_mode_idc is reserved for future use. When vps_all_independent_layers_flag is equal to 1 and each_layer_is_an_ols_flag is equal to 0, the value of ols_mode_idc may be inferred to be equal to 2.

num_output_layer_sets_minus1 plus 1 may specify the total number of OLSs specified by the VPS when ols_mode_idc is equal to a predetermined value (e.g., 2).

The variable TotalNumOlss, specifying the total number of OLSs specified by the VPS, is derived as shown in FIG. 11.

ols_output_layer_flag[i][j] equal to 1 may specify that the layer with nuh_layer_id equal to vps_layer_id[j] is an output layer of the i-th OLS when ols_mode_idc is equal to 2. ols_output_layer_flag[i][j] equal to 0 may specify that the layer with nuh_layer_id equal to vps_layer_id[j] is not an output layer of the i-th OLS when ols_mode_idc is equal to 2.

The variable NumOutputLayersInOls[i], specifying the number of output layers in the i-th OLS, the variable NumSubLayersInLayerInOLS[i][j], specifying the number of sublayers in the j-th layer in the i-th OLS, the variable OutputLayerIdInOls[i][j], specifying the nuh_layer_id value of the j-th output layer in the i-th OLS, and the variable LayerUsedAsOutputLayerFlag[k], specifying whether the k-th layer is used as an output layer in at least one OLS, may be derived like the pseudocode of FIG. 12.

For each value of i in the range of 0 to vps_max_layers_minus1, inclusive, the values of LayerUsedAsRefLayerFlag[i] and LayerUsedAsOutputLayerFlag[i] shall not be both equal to 0. In other words, there shall be no layer that is neither an output layer of at least one OLS nor a direct reference layer of any other layer.

For each OLS, there shall be at least one layer that is an output layer. In other words, for any value of i in the range of 0 to TotalNumOlss−1, inclusive, the value of NumOutputLayersInOls[i] shall be greater than or equal to 1.

The variable NumLayersInOls[i], specifying the number of layers in the i-th OLS, and the variable LayerIdInOls[i][j], specifying the nuh_layer_id value of the j-th layer in the i-th OLS, may be derived as shown in FIG. 13.

In an embodiment, the 0-th OLS contains only the lowest layer. The lowest layer may mean the layer with nuh_layer_id equal to vps_layer_id[0]. In addition, for the 0-th OLS, the only included layer may be output.

The variable OlsLayerIdx[i][j], specifying the OLS layer index of the layer with nuh_layer_id equal to LayerIdInOls[i][j], may be derived as shown in FIG. 14.

The lowest layer in each OLS shall be an independent layer. For example, for each i in the range of 0 to TotalNumOlss−1, inclusive, the value of vps_independent_layer_flag[GeneralLayerIdx[LayerIdInOls[i][0]]] shall be equal to 1.

Each layer shall be included in at least one OLS specified by the VPS.

Limit of Signaling of Max_Tid_Il_Ref_Pics_Plus1[i]

Signalling related to syntax element max_tid_il_ref_pics_plus1[i] has problems in its semantics and functionality.

For example, the semantics of max_tid_il_ref_pics_plus1[i] says that when its value is greater than 0, it means that the pictures in the i-th layer uses only up to max_tid_il_ref_pics_plus1[i]−1 sublayers from the reference picture for its inter-layer prediction.

This means that the pictures in the i-th layer uses only up to max_tid_il_ref_ref_pics_plus1[i]−1 sublayers from the reference picture for its inter-layer prediction.

The syntax element is designed to allow derivation of variable NumSubLayersInLayerInOLS[i][j] that may specify the number of sublayers in the j-th layer in the i-th OLS. Here, the OLS is an abbreviation for an output layer set and may mean a set of at least one layer specified by an output layer.

The variable NumSubLayersInLayerInOLS[i][j] can be used in bitstream extraction process to remove pictures in sublayers within a layer that is not an output layer in the extracted output layer set.

Such mechanism is not optimal when a layer uses more than 1 reference layer for inter-layer prediction and the number of sublayers used from each of the reference layers are not the same.

For example, assume that layer 2 refers to layer 0 and layer 1 for inter-layer prediction. For inter-layer prediction from layer 0, only 2 sublayers are used whereas from layer 1, 3 sublayers are used. In this example, then according to the above-described signalling mechanism, layer 2 uses 3 sublayers for inter-layer prediction, and, in such a method, sub-layer 3 or above cannot be removed from layer 0.

Improvement

The following embodiments provide solutions to the problems described above. Embodiments may be applicable individually or in combinations.

Improvement 1. For signalling of the maximum number of sublayers used for inter-layer prediction for a layer, instead of signalling one value for all reference layers, for each reference layer of the layer, the maximum number of sublayers used from that reference layer may be signalled.

Improvement 2: The maximum number of sublayers used from a reference layer j for layer i, may be present only when layer j is a direct reference layer of layer i.

Improvement 3: The flag that specifies whether the signalling of the maximum number of sublayers used for inter-layer prediction by a layer is present or not may be signalled one for all layers that are present in the VPS.

a) The syntax element max_tid_ref_present_flag[i] may be changed to max_tid_ref_present_flag.

b) max_tid_ref_present_flag may not be present when all layers are independent layers and, when max_tid_ref_present_flag is not present, max_tid_ref_present_flag may be inferred to be equal to 0.

Improvement 4. Derivation for NumSubLayersInLayerInOLS for both direct and indirect reference layers may be addressed as follows.

a) If the each_layer_is_an_ols_flag[i] is equal to 1 (e.g., true), then the NumSubLayersInLayerInOLS[i][0] is set equal to vps_max_sub_layers_minus1+1 b) If the each_layer_is_an_ols_flag is 0 (e.g., false), then for each OLS and vps_direct_ref_layer_flag[1][k] is true, then the NumSubLayersInLayerInOLS[i][GeneralLayerIdx[vps_layer_id[k]]] may be derived to be max_tid_il_ref_pics_plus1[1][k].

c) Improvement 4 may be applied when the ols_mode_idc is equal to 2.

Embodiment 1

In an embodiment, Improvements 1 and 2 may be implemented according to the syntax of the changed VPS shown in FIG. 15. Hereinafter, the syntax elements of FIG. 15 changed from the above-described VPS syntax will be described.

vps_independent_layer_flag[i] equal to 1 may specify that the layer with index i does not use inter-layer prediction. vps_independent_layer_flag[i] equal to 0 may specify that the layer with index i may use inter-layer prediction and the syntax elements vps_direct_ref_layer_flag[i][j] for j in the range of 0 to i−1, inclusive, are present in VPS. When the value of vps_independent_layer_flag[i] is not obtained from the bitstream, the value of vps_independent_layer_flag[i] may be inferred to be equal to 1.

max_tid_ref_present_flag[i] equal to 1 may specify that the syntax element max_tid_il_ref_pics_plus1[i][j] is present in the bitstream. max_tid_ref_present_flag[i] equal to 0 may syntax element specify that the max_tid_il_ref_pics_plus1[i][j] is not present in the bitstream.

max_tid_il_ref_pics_plus1[i][j] equal to 0 may specify that the j-th layer is not used as reference layer for inter-layer prediction by non-IRAP pictures of the i-th layer. max_tid_il_ref_pics_plus1[i][j] greater than 0 may specify that, for decoding of pictures of the i-th layer, no picture from the j-th layer with TemporalId greater than max_tid_il_ref_pics_plus1[i][j]−1 is used as ILRP. When the value of max_tid_il_ref_pics_plus1[i][j] is not obtained from the bitstream, value of max_tid_il_ref_pics_plus1[i][j] may be inferred to be equal to 7.

In addition, using the syntax elements and variables changed according to the above description, variables NumOutputLayersInOls[i], NumSubLayersInLayerInOLS[i][j], OutputLayerIdInOls[i][j], and LayerUsedAsOutputLayerFlag[k] may be determined like the pseudocode of FIG. 16.

Like the above-described method, for each reference layer of one layer, a maximum number of sublayers used for the reference layer may be signalled and the maximum number of sublayers used from the reference layer j for layer i may be provided only when layer j is a direct reference layer of layer i.

Embodiment 2

In an embodiment, Improvement 3 may be implemented according to the syntax of the changed VPS shown in FIG. 17. For example, like max_tid_ref_present_flag of FIG. 17, a flag that specifies whether signalling of a maximum number of sublayers used for inter-layer prediction by a layer is present or not may be signalled one for all layers.

For example, the syntax element max_tid_ref_present_flag equal to 1 of FIG. 17, which is changed from the syntax of the VPS described above, may specify that the syntax element max_tid_il_ref_pics_plus1[i] is present in the bitstream. max_tid_ref_present_flag equal to 0 may specify that the syntax element max_tid_il_ref_pics_plus1[i] is not present in the bitstream.

Embodiment 3

Derivation of NumOutputLayersInOls according to Improvements 1, 2 and 4 described above may be performed according to the pseudocode of FIG. 18. FIG. 18 is a view illustrating a pseudocode indicating a method of deriving NumOutputLayersInOls for a direct reference layer and an indirect reference layer.

As shown in FIG. 18, when the value of ols_mode_idc is equal to 2, if the value of each_layer_is_an_ols_flag[i] is true, NumSubLayersInLayerInOLS[i][0] may be set to vps_max_sub_layers_minus1+1, and, if the value of each_layer_is_an_ols_flag[i] is false, and, for each OLS, the value of vps_direct_ref_layer_flag[1][k] is true, NumSubLayersInLayerInOLS[i][GeneralLayerIdx[vps_layer_id[k]]] may be derived to be max_tid_il_ref_pics_plus1[1][k].

Encoding and Decoding Method

Figure 19:
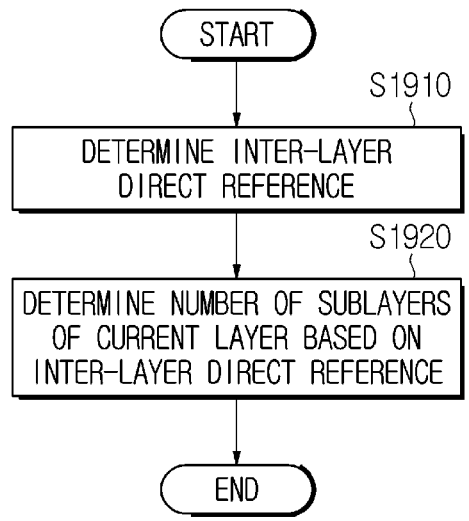
FIG. 19 is a view illustrating an encoding and/or decoding method according to another embodiment of the present disclosure.

Hereinafter, an image encoding and decoding method performed by an image encoding and decoding apparatus according to an embodiment will be described. FIG. 19 is a view illustrating a method of determining the number of sublayers of a current layer in order for an image encoding apparatus according to an embodiment to encode an image and/or for an image decoding apparatus to decode an image.

The image decoding apparatus according to an embodiment includes a memory and a processor, and the decoding apparatus may perform decoding according to the below-described embodiments by operation of the processor. The image encoding apparatus according to an embodiment includes a memory and a processor, and the encoding apparatus may perform encoding in a manner corresponding to decoding of the decoding apparatus according to the below-described embodiment by operation of the processor. Hereinafter, for convenience of description, operation of the decoding apparatus will be described, but the following description is applicable to the encoding apparatus.

In an embodiment, the number of sublayers of a current layer may be used to mean the number of sublayers belonging to the current layer. However, in another embodiment, the number of sublayers of the current layer may be used to mean the number of sublayers required for the current layer.

The decoding apparatus according to an embodiment may determine inter-layer direct reference (S1910). Inter-layer direct reference may be determined by direct reference layer information obtained from a bitstream. In addition, the direct reference layer information may indicate inter-layer direct reference. For example, the direct reference layer information may be the above-described syntax element vps_direct_ref_layer_flag[i][j].

The direct reference layer information may be obtained from the bitstream for an encoded layer based on inter-layer prediction. Here, whether encoding is performed based on inter-layer prediction may be determined based on independent layer information obtained from the bitstream. For example, the independent layer information may be the above-described syntax element vps_independent_layer_flag[i].

Next, the decoding apparatus may determine the number of sublayers of the current layer based on the inter-layer direct reference (S1920).

Here, the number of sublayers of the current layer may be determined based on whether the current layer is an output layer. In an embodiment, whether the current layer is an output layer may be determined by "if (each_layer_is_an_ols_flag)" or "if (ols_output_layer_flag[i][k])" as shown in the pseudocode of FIG. 18.

In an embodiment, the number of sublayers of the current layer may be determined to be an available maximum number of sublayers, based on whether the current layer is an output layer. This may be implemented by "NumSubLayersInLayerInOLS[i][j] =vps_max_sub_layers_minus1+1" as shown in the pseudocode of FIG. 18.

In an embodiment, based on whether the current layer is not an output layer, the number of sublayers of the current layer may be determined to be a predetermined value determined based on inter-layer direct reference.

Here, the predetermined value may be determined based on maximum identifier information indicating a picture which may be referenced to perform inter-layer prediction. The maximum identifier information may be information indicating that a picture having a temporal identifier greater than a value identified by the maximum identifier information among a plurality of pictures of a first layer is not used as an inter-layer reference picture to decode a current picture of a second layer, and, for example, the maximum identifier information may be the above-described syntax element max_tid_il_ref_pics_plus1[i][j].

In an embodiment, the first layer may be the current layer, and the second layer may be a layer capable of using the current layer as a direct reference layer.

For example, the maximum identifier information may be max_tid_il_ref_pics_plus1[1][k] shown in FIG. 18. In addition, a relationship between a sublayer of a current layer and a layer which may directly refer to the same may be identified by "if (vps_direct_ref_layer_flag[1][k])" of FIG. 18.

Whether the current layer is an output layer may be determined based on output layer set mode information obtained from a bitstream, and the output layer set mode information may be the above-described syntax element ols_mode_idc.

In addition, whether the current layer is an output layer may be determined based on output layer set mode information and an output layer flag obtained from a bitstream, and output layer be flag may the above-described syntax element ols_output_layer_flag[i][j].

Based on the number of sublayers determined in this manner, the decoding apparatus may decode the current layer by performing inter-layer prediction of the current layer, and the encoding apparatus may encode the current layer by performing inter-layer prediction of the current layer.

For example, in an embodiment, an image decoding method may comprise steps of obtaining a maximum allowed number of layers (e.g., vps_max_layers_minus1) from bitstream, identifying a current layer having a first index (e.g., i) based on the maximum allowed number of layers, obtaining an independent layer flag (e.g., vps_independent_layer_flag[i]) indicating whether the current layer is coded based on inter layer prediction from the bitstream, obtaining a maximum temporal identifier signaling flag (e.g., vps_max_tid_ref_present_flag[i]) from the bitstream based on the independent layer flag, determining a second index (e.g., j) which is smaller than the first index, obtaining a direct reference layer flag (e.g., vps_direct_ref_layer_flag[i][j]) indicating whether the reference layer having the second index is direct reference layer of the current layer from the bitstream based on the independent layer flag, the first index and the second index, obtaining a maximum temporal identifier information (e.g., vps_max_tid_il_ref_pics_plus1[i][j]) from the bitstream based on the maximum temporal identifier signaling flag and the direct reference layer flag, and determining a number of sublayers of the reference layer (e.g., NumSubLayersInLayerInOLS[i][k]) based on the maximum temporal identifier information.

Here, the sublayers are capable of being referenced from the current layer, and the maximum temporal identifier signaling flag may indicate whether the maximum temporal identifier information is obtained from the bitstream. Furthermore, a picture, among pictures of the reference layer, having a value of a temporal identifier greater than a value identified by the maximum temporal identifier information may be not used as an inter layer reference picture for decoding a current picture of the current layer.

In addition, in an embodiment, an image encoding method may comprise steps of encoding a reference picture in a reference layer, encoding a current picture in a current layer based on the reference picture, and generating a bitstream including encoded information of the current picture.

Here, an independent layer flag (e.g., vps_independent_layer_flag[i]) indicating whether the current layer is encoded based on an inter layer prediction is included in the bitstream. Furthermore, a maximum temporal identifier signaling flag (e.g., vps_max_tid_ref_present_flag[i]) may be included in the bitstream based on whether the current layer is encoded based on the inter layer prediction. Furthermore, a direct reference layer flag (e.g., vps_direct_ref_layer_flag[i][j]) indicating whether the reference layer is a direct reference layer of the current layer may be included in the bitstream.

Furthermore, a maximum temporal identifier information (e.g., vps_max_tid_il_ref_pics_plus1[i][j]) may be included in the bitstream based on the maximum temporal identifier signaling flag and the direct reference flag. Furthermore, a number of sublayers of the reference layer capable of being referenced from the current layer (e.g., NumSubLayersInLayerInOLS[i][k]) may be encoded based on the maximum temporal identifier information.

Application Embodiment

While the exemplary methods of the present disclosure described above are represented as a series of operations for clarity of description, it is not intended to limit the order in which the steps are performed, and the steps may be performed simultaneously or in different order as necessary. In order to implement the method according to the present disclosure, the described steps may further include other steps, may include remaining steps except for some of the steps, or may include other additional steps except for some steps.

In the present disclosure, the image encoding apparatus or the image decoding apparatus that performs a predetermined operation (step) may perform an operation (step) of confirming an execution condition or situation of the corresponding operation (step). For example, s described that predetermined operation is performed when a predetermined condition is satisfied, the image encoding apparatus or the image decoding apparatus may perform the predetermined operation after determining whether the predetermined condition is satisfied.

The various embodiments of the present disclosure are not a list of all possible combinations and are intended to describe representative aspects of the present disclosure, and the matters described in the various embodiments may be applied independently or in combination of two or more.

Various embodiments of the present disclosure may be implemented in hardware, firmware, software, or a combination thereof. In the case of implementing the present disclosure by hardware, the present disclosure can be implemented with application specific integrated circuits (ASICs), Digital signal processors (DSPs), digital signal processing devices (DSPDs), programmable logic devices (PLDs), field programmable gate arrays (FPGAs), general processors, controllers, microcontrollers, microprocessors, etc.

In addition, the image decoding apparatus and the image encoding apparatus, to which the embodiments of the present disclosure are applied, may be included in a multimedia broadcasting transmission and reception device, a mobile communication terminal, a home cinema video device, a digital cinema video device, a surveillance camera, a video chat device, a real time communication device such as video communication, a mobile streaming device, a storage medium, a camcorder, a video on demand (VOD) service providing device, an OTT video (over the top video) device, an Internet streaming service providing device, a three-dimensional (3D) video device, a video telephony video device, a medical video device, and the like, and may be used to process video signals or data signals. For example, the OTT video devices may include a game console, a blu-ray player, an Internet access TV, a home theater system, a smartphone, a tablet PC, a digital video recorder (DVR), or the like.

Figure 20:
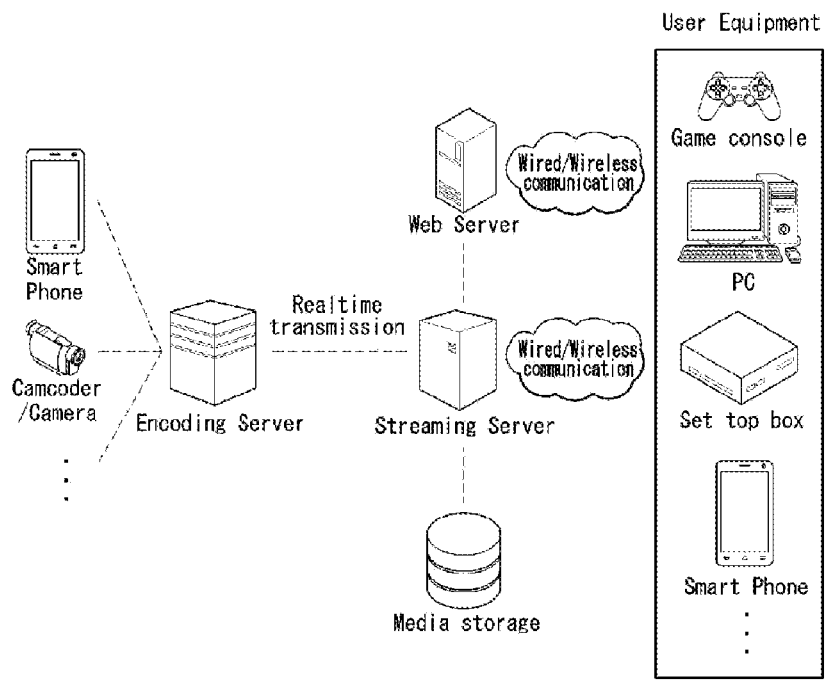
FIG. 20 is a view showing a content streaming system, to which an embodiment of the present disclosure is applicable.

FIG. 20 is a view showing a content streaming system, to which an embodiment of the present disclosure is applicable.

As shown in FIG. 20, the content streaming system, to which the embodiment of the present disclosure is applied, may largely include an encoding server, a streaming server, a web server, a media storage, a user device, and a multimedia input device.

The encoding server compresses content input from multimedia input devices such as a smartphone, a camera, a camcorder, etc. into digital data to generate a bitstream and transmits the bitstream to the streaming server. As another example, when the multimedia input devices such as smartphones, cameras, camcorders, etc. directly generate a bitstream, the encoding server may be omitted.

The bitstream may be generated by an image encoding method or an image encoding apparatus, to which the embodiment of the present disclosure is applied, and the streaming server may temporarily store the bitstream in the process of transmitting or receiving the bitstream.

The streaming server transmits the multimedia data to the user device based on a user's request through the web server, and the web server serves as a medium for informing the user of a service. When the user requests a desired service from the web server, the web server may deliver it to a streaming server, and the streaming server may transmit multimedia data to the user. In this case, the content streaming system may include a separate control server. In this case, the control server serves to control a command/response between devices in the content streaming system.

The streaming server may receive content from a media storage and/or an encoding server. For example, when the content is received from the encoding server, the content may be received in real time. In this case, in order to provide a smooth streaming service, the streaming server may store the bitstream for a predetermined time.

Examples of the user device may include a mobile phone, a smartphone, a laptop computer, a digital broadcasting terminal, a personal digital assistant (PDA), a portable multimedia player (PMP), navigation, a slate PC, tablet PCs, ultrabooks, wearable devices (e.g., smartwatches, smart glasses, head mounted displays), digital TVs, desktops computer, digital signage, and the like.

Each server in the content streaming system may be operated as a distributed server, in which case data received from each server may be distributed.

The scope of the disclosure includes software or machine-executable commands (e.g., an operating system, an application, firmware, a program, etc.) for enabling operations according to the methods of various embodiments to be executed on an apparatus or a computer, a non-transitory computer-readable medium having such software or commands stored thereon and executable on the apparatus or the computer.

INDUSTRIAL APPLICABILITY

The embodiments of the present disclosure may be used to encode or decode an image.

The invention claimed is:

1. An image decoding method performed by an image decoding apparatus, the image decoding method comprising:
    determining whether a first layer is a direct reference layer for a current layer, wherein the first layer is a layer other than the current layer; and
    determining a number of sublayers of the current layer based on the whether the first layer is the direct reference layer for the current layer,
    wherein based on that the current layer is not an output layer, the number of the sublayers of the current layer is set as a predetermined value determined based on the whether the first layer is the direct reference layer for the current layer.

2. The image decoding method of claim 1,
    wherein the whether the first layer is the direct reference layer for the current layer is determined by direct reference layer information obtained from a bitstream.

3. The image decoding method of claim 2, wherein the direct reference layer information is obtained from the bitstream for a layer encoded based on inter-layer prediction.

4. The image decoding method of claim 3, wherein whether the layer is encoded based on the inter-layer prediction is determined based on independent layer information obtained from the bitstream.

5. The image decoding method of claim 1, wherein the number of sublayers of the current layer is determined to be an available maximum number of sublayers, based on whether the current layer is the output layer.

6. The image decoding method of claim 1, wherein the predetermined value is determined based on maximum identifier information indicating a picture capable of being referenced to perform inter-layer prediction.

7. The image decoding method of claim 6, wherein the maximum identifier information indicates that a picture having a temporal identifier greater than a value identified by the maximum identifier information among a plurality of pictures of the current layer is not used as an inter-layer reference picture to decode a target picture of a second layer.

8. The image decoding method of claim 7, wherein the second layer is a layer capable of using the current layer as a direct reference layer.

9. The image decoding method of claim 1, wherein the whether the current layer is the output layer is determined based on output layer set mode information obtained from a bitstream.

10. The image decoding method of claim 1, wherein the whether the current layer is the output layer is determined based on output layer set mode information and an output layer flag obtained from a bitstream.

11. An image encoding method performed by an image encoding apparatus, the image encoding method comprising:
determining whether a first layer is a direct reference layer for a current layer, wherein the first layer is a layer other than a current layer; and
determining a number of sublayers of the current layer based on the whether the first layer is the direct reference layer for the current layer,
wherein based on that the current layer is not an output layer, the number of sublayers of the current layer is determined to be a predetermined value determined based on the whether the first layer is the direct reference layer for the current layer.

12. A non-transitory computer-readable recording medium storing a bitstream generated by the image encoding method of claim 11.

13. A method for transmitting a bitstream generated by an image encoding method, the image encoding method comprising:
determining whether a first layer is a direct reference layer for a current layer, wherein the first layer is a layer other than a current layer; and
determining a number of sublayers of the current layer based on the whether the first layer is the direct reference layer for the current layer,
wherein based on that the current layer is not an output layer, the number of sublayers of the current layer is determined to be a predetermined value determined based on the whether the first layer is the direct reference layer for the current layer.

* * * * *